US012435001B2

(12) United States Patent
Mandler et al.

(10) Patent No.: US 12,435,001 B2
(45) Date of Patent: Oct. 7, 2025

(54) COMPRESSED SALT OBJECTS

(71) Applicant: Yissum Research Development Company of the Hebrew University of Jerusalem Ltd., Jerusalem (IL)

(72) Inventors: Daniel Mandler, Jerusalem (IL); Noa Lapidot, Mevasseret Zion (IL); Andrea Buffa, Jerusalem (IL); Gabriel Dikovsky, Ari'el (IL); Lihi Rikanati, Modi'in (IL)

(73) Assignee: Yissum Research Development Company of the Hebrew University of Jerusalem Ltd., Jerusalem, IL (US)

( * ) Notice: Subject to any disclaimer, the term of this patent is extended or adjusted under 35 U.S.C. 154(b) by 409 days.

(21) Appl. No.: 16/498,133

(22) PCT Filed: Mar. 27, 2018

(86) PCT No.: PCT/IL2018/050354
§ 371 (c)(1),
(2) Date: Sep. 26, 2019

(87) PCT Pub. No.: WO2018/178980
PCT Pub. Date: Oct. 4, 2018

(65) Prior Publication Data
US 2020/0031714 A1 Jan. 30, 2020

Related U.S. Application Data

(60) Provisional application No. 62/613,472, filed on Jan. 4, 2018, provisional application No. 62/479,675, filed on Mar. 31, 2017.

(51) Int. Cl.
*C04B 18/02* (2006.01)
*C04B 14/28* (2006.01)
(Continued)

(52) U.S. Cl.
CPC .............. *C04B 18/02* (2013.01); *C04B 14/28* (2013.01); *C04B 20/12* (2013.01); *C04B 24/42* (2013.01);
(Continued)

(58) Field of Classification Search
CPC ....... C04B 22/147; C04B 14/28; C04B 20/12; C04B 14/26; C04B 18/021; C04B 22/10; C04B 40/0071; C04B 18/02; C04B 24/42; C04B 28/30; C04B 30/00; C04B 41/50; C04B 20/1033; C04B 20/1077;
(Continued)

(56) References Cited

U.S. PATENT DOCUMENTS 2,599,436 A 6/1952 Dancy
3,211,581 A * 10/1965 Van Schelven ....... C04B 41/009
23/313 R
(Continued)

FOREIGN PATENT DOCUMENTS

WO WO-2017005714 A1 * 1/2017 ............. A23L 27/77

*Primary Examiner* — Shuangyi Abu Ali
(74) *Attorney, Agent, or Firm* — FisherBroyles, LLP; Roger L. Browdy

(57) ABSTRACT

Provided are objects constructed of compressed salt combinations including salt and at least one additive, wherein the at least one additive is selected to impart the object with resistance to water and humidity.

18 Claims, 9 Drawing Sheets

(51) Int. Cl.
*C04B 20/12* (2006.01)
*C04B 24/42* (2006.01)
*C04B 28/10* (2006.01)
*C04B 28/26* (2006.01)
*C04B 41/48* (2006.01)
*C04B 41/50* (2006.01)
C04B 111/00 (2006.01)

(52) U.S. Cl.
CPC .............. *C04B 28/10* (2013.01); *C04B 28/26* (2013.01); *C04B 41/48* (2013.01); *C04B 41/50* (2013.01); *C04B 2111/00293* (2013.01)

(58) Field of Classification Search
CPC ........... C04B 2111/00293; C04B 26/32; C04B 28/00; C04B 28/10; C04B 28/26; C04B 28/34; C04B 41/48; Y02P 90/02; Y02P 90/30

See application file for complete search history.

(56) References Cited

U.S. PATENT DOCUMENTS

| | | | |
|---|---|---|---|
| 4,539,179 A | | 9/1985 | Meloy |
| 2019/0110510 A1* | | 4/2019 | Altena .................... A23P 10/25 |

* cited by examiner

COMPRESSED SALT OBJECTS

TECHNOLOGICAL FIELD

The present disclosure relates to compressed salt objects, methods for their preparation and uses thereof.

BACKGROUND

Food grade salt is compressed to solid block and bricks and sold worldwide as food supplement for cattle and horses, where the animals dissolve some salt in their saliva by licking the salt block surface. Compressing of salt provides low rate of dissolution that is suitable for the purpose of animal feed supplement, but is insufficient to allow utilization of salt blocks in applications that require prevention of salt dissolution.

As sodium chloride salt is produced in large amounts, as a result of human activity in some areas in the world, it is desired to facilitate additional uses of compressed salt by providing a stabilized salt formulation and/or providing a coating that will prevent salt dissolution, allow for integration of the salt objects in applications where these objects can replace more expensive or less available materials, or offer a design alternative of interest. Moreover, it is desired to provide a formulation and/or a coating that allow control of esthetic and artistic appearance of the object, either by maintaining the salt surface appearance, by providing a transparent coating, or by facilitating the inclusion of color and texture elements in the object through its compressing and coating.

Salt is known to have beneficial properties to air quality and to assist in alleviating symptoms related to respiratory and pulmonary diseases. Salt is non-toxic, has anti-microbial properties, and is inflammable. Production of compressed objects does not require much energy, certainly when compared to cement production. Furthermore, compressed salt objects may be recycled by grinding and compressing once more.

U.S. Pat. No. 3,211,581 discloses water proofing of salt blocks to be used for building in applications that require low tensile strength by coating such blocks with epoxy resin (e.g. epoxy resin that is used to coat electric wires).

U.S. Pat. No. 2,599,436 describes production of salt blocks by mold casting rather than compressing, the salt grains are cemented by magnesium oxychloride (Sorel cement). This is achieved by mixing magnesium oxide with the salt, and adding a magnesium chloride solution such that the magnesium chloride and oxide react to form magnesium oxychloride that binds the sodium chloride crystals.

REFERENCES

[1] U.S. Pat. No. 3,211,581.
[2] U.S. Pat. No. 2,599,436

SUMMARY OF THE INVENTION

Halite, i.e. sodium chloride, accumulates in large amounts as a byproduct of many industries, such as the Dead Sea Minerals industry in Israel and Jordan, both harvesting potash and other minerals from the Dead Sea by solar evaporation in large pools covering the southern basin of the Dead Sea. Accumulated salt causes an approximate 10-20 cm/year rise in the level of water at the southern basin, necessitating harvesting of some 20 million tons/year. Similar residues of sodium chloride mountains are produced as byproduct of inland potash mining, e.g., in Spain and Germany Inland desalination plants produce high concentration brines, which could potentially be dried to salt too, if the salt could be utilized. Hence, it is desired to find useful applications to crude sodium chloride, or any other salt precipitates that accumulate as byproduct of human activities in various locations in the world.

As sodium chloride is naturally water-soluble and is well known to cause corrosion in metals and accelerated degradation of other materials, such as cement constructions and various organic polymers, it is necessary to either develop a stable coating that can effectively encase salt blocks and insulate them from their surroundings or formulate a salt composition that would render the salt with such characteristics that can make the salt composition suitable for new uses.

The inventors of the technology disclosed herein have surprisingly found that the addition of an additive to a salt composition endows the composition with resistance to water and further resistance to humidity, while still maintaining high compressive resistance that is inherent to compressed salt objects. The additive added to the composition is selected to endow the final composition or object, formed therefrom, with one or more additional characteristics that may be tailored in accordance with the product conditions of use. Salt-based products according to the invention may thus be manufactured in a variety of sizes, shapes and for a variety of uses, for example, as salt blocks or salt boards for a variety of applications such as in building elements, for the construction of buildings, roads, ornaments, toys, household interior and exterior design elements and filling elements.

Thus, the present disclosure relates to the making and usage of compressed salt objects and artifacts having improved characteristics as compared to compressed salt objects free of additives, as disclosed herein.

In accordance with a first aspect, the present invention provides an object constructed of a compressed salt combination comprising salt and at least one additive, the at least one additive being selected to impart the object with resistance to water and humidity, the compressed salt combination being characterized by a compressive strength of at least 20 MPa (when measured on a 2×2×2 $cm^3$ salt block). As indicated below, the compressive strengths, measured for objects free of the at least one additive, have been significantly lower. Also, as comparison, a cement cube of the same dimensions exhibited a compressive strength of about 4 MPa.

Thus, the object of the invention is not only imparted with resistance to water and humidity, but is able of sustaining much greater compressive forces and therefore could be used for reinforcement and fortification.

In some embodiments, the at least one additive is selected to interact in situ with at least one component present in the salt combination, to increase or modify resistance to water and humidity, or render the compressed salt combination non-deliquescent (when measured at 40° C. at below 74% relative humidity).

The invention further provides an object constructed of a compressed salt combination comprising salt and at least one additive, the at least one additive being selected to impart the object with resistance to water and humidity, the compressed salt combination being non-deliquescent, when measured at 40° C. at below 74% relative humidity (when measured on a 2×2×2 $cm^3$ salt block). As indicated below, salt objects free of the at least one additive have exhibited deliquescence at relative humidities of between 30 and 60%.

The invention further provides an object constructed of a compressed salt combination comprising salt and at least one additive, the at least one additive being selected to impart the object with resistance to water and humidity by interacting in situ with at least one component present in said salt combination to afford a water-insoluble material, the compressed salt combination being non-deliquescent, when measured at 40° C. at below 74% relative humidity, or of a compressive strength of at least 20 MPa (when measured on a 2×2×2 cm$^3$ salt block).

As used herein, the expression "resistance to water and humidity" refers to any of the characteristics provided hereinbelow, including prevention or minimization or rendering the object resistant to dissolution and deliquescence.

In some embodiments, and as further detailed herein, the at least one component present in said salt combination is an ion selected from Mg and Ca ions.

In some embodiments, and as further detailed herein, the at least one additive selected to impart the object with resistance to water and humidity by interacting in situ with at least one component present in said salt combination is a water-soluble carbonate.

In some embodiments, and as further detailed herein, the water-insoluble material is magnesium carbonate and/or calcium carbonate.

In some embodiments, the at least one additive selected to impart the object with resistance to water and humidity by interacting in situ with at least one component present in said salt combination is a water-soluble carbonate, which upon interaction with magnesium and/or calcium ions present in the salt combinations afford water-insoluble magnesium carbonate and/or calcium carbonate that assist in increasing resistance to water and humidity. In some embodiments, virtually all chloride salts of magnesium and calcium are exchanged for insoluble magnesium and calcium salts. In some embodiments, water soluble salts present in Dead Sea Salt (DSS) such as $MgCl_2(H_2O)_4$; $MgCl_2(H_2O)_2$; $MgCl_2(H_2O)_n$, wherein 1<n<2; $Mg(OH)Cl$; $Mg(OH)Cl(H_2O)_{0.3}$; $Mg(OH)Cl$; $KMgCl_3(H_2O)_6$; $KMg(SO_4)Cl(H_2O)_3$; $CaCl_2(H_2O)_6$; or $CaMg_2Cl_6(H_2O)_{12}$ cannot be detected after the exchange to insoluble salts.

In some embodiments, any of the objects of the invention or those manufactured according to a process of the invention comprises at least one stearate, as further detailed herein.

In some embodiments, where the object consists of a compressed salt combination, the characteristics of the compressed salt combination are the same as the characteristics of the (compressed) object. In other words, in some embodiments, the object is a compressed object consisting a salt combination and at least one additive.

The at least one additive is selected to endow the compressed salt combination (or object) with one or more of the following characteristics, as compared to a salt object that is free of the at least one additive:
 increased resistance to decomposition (partially or completely) by water;
 increased resistance to deliquescence;
 decreased water penetration;
 objects submerged in water for a given time preserve compressive strength which is still greater than the compressive strength of a cement object of same dimensions, preferably at least twice as greater;
 increased surface hydrophobicity;
 increased compressive strength;
 increased elasticity;
 modified color;
 lubrication for easy release of the object from the compressing die.

The nature and amount of the at least one additive are selected or tailored to achieve one or more of the above characteristics. Generally speaking, the amount of the at least one additive may be homogenously distributed in a salt combination or may be selected to be concentrated only at certain regions of the object. The region-specific concentration may be achieved by tailoring region-specific distribution or may be spontaneous as some additives may migrate to particular regions of the object, e.g., to the external surface of the object. The amount of the at least one additive, relative to the total weight of the salt combination, may be as low as 0.1 wt %. In some embodiments, the amount is between about 0.1% and 15%. In some embodiments, the amount is between about 1% and 15%. In some embodiments, the amount is between about 3% and 10%, between about 5% and 8%, or between about 5% and 7%. In some embodiments, the amount is about 0.1, 0.2, 0.3, 0.4, 0.5, 0.6, 0.7, 0.8, 0.9, 1, 2, 3, 4, 5, 6, 7, 8 or 9% relative to the total weight of the combination. In some embodiments, the amount is about 1, 2, 3, 4, 5, 6, 7, 8 or 9% relative to the total weight of the combination.

The at least one additive used to impart the salt combination with the improved characteristic(s) may be a single additive or a combination of two or more additives, wherein the amounts of the two or more additives may or may not be the same. The additives may be selected from the same material group or from different material groups. The additives may be selected based on their ability to undergo a chemical or physical transformation under processing conditions, environmental conditions or in the presence of other materials that are present in (or which are added to) the salt combination.

The at least one additive may be generally selected from organic or inorganic materials, which may be water-soluble or water-insoluble. Non-limiting examples of additives include water soluble or water-insoluble carbonate salts, $C_{12}$ to $C_{20}$ carboxylates (or carboxylic acids), water soluble silicates, siloxane polymers, siloxane polymer precursors, phosphate salts, hydroxide salts, gypsum, lime slag cements and any combination thereof.

In some embodiments, the at least one additive is a water-soluble carbonate salt. In some embodiments, the water-soluble carbonate is one, which upon interaction with ions, e.g., magnesium and/or calcium ions, present in the salt combination, afford water-insoluble salts, e.g., magnesium carbonate and/or calcium carbonate salts. These water-insoluble salts increase or assist in increasing resistance of the salt combination to water and humidity.

In some embodiments, the at least one additive is a carbonate salt of a metal selected amongst monovalent and divalent metals. The carbonate salts may be selected amongst alkali metal salts, such as lithium carbonate ($Li_2CO_3$), sodium carbonate ($Na_2CO_3$) and potassium carbonate ($K_2CO_3$) and other water-soluble metal carbonates. In some embodiments, the carbonate salts may be selected amongst alkaline earth metal carbonates, such as barium carbonate ($BaCO_3$), calcium carbonate ($CaCO_3$) and magnesium carbonate ($MgCO_3$), and other water-insoluble metal carbonates.

In some embodiments, the at least one additive is a monovalent metal carbonate. In some embodiments, the additive is a divalent metal carbonate, which may be added as such or formed in situ by ion exchange of ions, to result, over time, in the formation of insoluble metal carbonates, such as $MgCO_3$, $CaCO_3$, and others.

In some embodiments, the at least one additive is sodium carbonate.

In some embodiments, the at least one additive is magnesium carbonate.

In some embodiments, the at least one additive is a combination of two or more additives, e.g., sodium carbonate and magnesium carbonate.

In some embodiments, the at least one additive is a combination of two or more additives, at least one of said two or more additives is sodium carbonate, potassium carbonate, magnesium carbonate and/or calcium carbonate.

In some embodiments, the at least one additive is a combination of two or more additives, at least one of said two or more additives is sodium carbonate, potassium carbonate, magnesium carbonate and/or calcium carbonate, and at least another of the two or more additives is at least one metal stearate.

In some embodiments, the additive is a water-insoluble carboxylate or carboxylic acid, which may be naturally occurring, semi-synthetic or synthetic. In some embodiments, the carboxylic acid is a fatty acid. In some embodiments, the fatty acid comprises between 12 and 20 carbon atoms.

Non-limiting examples of such carboxylic acids include lauric acid, myristic acid, palmitic acid, stearic acid, oleic acid, linoleic acid, or linolenic acids, as well as resin acids such as abiatic type acid including abiatic acid, dehydroabietic acid, neoabietic acid, or pimaric type acids including pimaric acid, sandaracopimaric acid, isopimaric acid and palustric acid.

The at least one additive may be the acid form itself or a metal carboxylate thereof. In some embodiments, the at least one additive is a metal carboxylate selected amongst monovalent carboxylates and divalent carboxylates. In some embodiments, the at least one additive is a metal carboxylate selected from alkali metal carboxylates, such as lithium carboxylate, sodium carboxylate and potassium carboxylate and alkaline earth metal carboxylates, such as barium carboxylate, calcium carboxylate and magnesium carboxylate. In some embodiments, the at least one additive is two or more additives, selected from carboxylic acids, e.g., fatty acids and metal carboxylates.

In some embodiments, the at least one additive is stearic acid and/or a metal form thereof.

In some embodiments, the at least one additive is a monovalent carboxylates, e.g., sodium stearate, or a divalent carboxylate, e.g., magnesium distearate. The divalent, less soluble or insoluble, carboxylates may be added as such or may be formed in situ by ion exchange of ions to result, over time.

In some embodiments, the at least one additive is a carbonate salt or a combination thereof with at least one other additive, such as at least one carboxylate salt.

In some embodiments, the additive is a combination of sodium stearate and sodium carbonate. In some embodiments, the additive is a combination of sodium stearate and magnesium carbonate. In some embodiments, the additive is a combination of sodium stearate, sodium carbonate and magnesium carbonate.

In some embodiments, the at least one additive is gypsum.

In some embodiments, the at least one additive is lime.

In some embodiments, the at least one additive is a silicate.

In some embodiments, the at least one additive is a siloxane or a siloxane polymer. In some embodiments, the siloxane or siloxane polymer is selected from Silres® BS Poweder S, Silres® BS94 (Wacker Chemie AG) and other grades of the Silres® line, XIAMETER® MHX-1107 FLUID, SiSiB® PF2020 FLUID (Power Chemical Corporation Ltd.) and additional suppliers and trimethylsiloxy silicate trimethylsiloxysilicate (TMSS).

As stated above, the at least one additive is added to the salt combination such that it may uniformly occupy the volume of the combination. In other words, when the compressed object is manufactured, the additive is uniformly distributed therein. In some cases, the additive can migrate over time to the external boundaries of the object. This migration may be thermally hastened or controlled. In some cases, a siloxane additive is selected to undergo crosslinking so that over time a three dimensional network of a siloxane polymer is formed within the compressed object, amongst the salt crystals.

An additive may also be added in select regions of the object to endow those regions with specific or enhanced characteristics. An additive may additionally or alternatively be added to the surface of the object, as a film or a coat that endows the object with additional protection or new or modified surface properties.

The nature of the selected at least one additive may be determined based, inter alia, on the salt composition, the size (volume or weight) of the object to be formed, the particle size, the presence of one or more additives or materials that may have an effect on the nature or function of the additive, the desired use of the object, the conditions under which the object is to be used, and others.

The salt combination may be a naturally occurring salt combination, an industrial salt combination or any combination of salts or minerals of varying origins. The salt combination may comprise different salts that co-precipitate together, for example salts originating from the Dead Sea or from any natural salt reservoir. The salt combination may be a byproduct of Carnallite precipitation, or a byproduct of any industrial process, including for example potash production from sylvinite mines, water desalination plants or any other industrial process. The salt composition may be collected in a form of a slurry or as a water brine from sea (for example from the Dead Sea).

Notwithstanding the origin of the salt combination, it may comprise various halide salts. In some embodiments, the salt combination comprising halite (sodium chloride). In some embodiments, the salt combination comprises at least 60%, at least 70%, at least 80%, at least 90%, at least 95%, or 100% sodium chloride. In other words, in some embodiments, the salt combination consists sodium chloride and at least one additive.

In some embodiments, the salt combination comprises sodium chloride and at least one metal ion. The at least one metal ion may be an alkali metal, such as lithium, sodium and potassium, an alkaline earth metal, such as barium, calcium and magnesium, and/or any other metal of the periodic table present in any one or more of the aforementioned salt combinations. In some embodiments, the metal ion is selected from potassium ions, magnesium ions, calcium ions and others.

In some embodiments, the salt combination comprises sodium chloride and at least one additional metal halide, such as potassium chloride (KCl), magnesium chloride ($MgCl_2$), potassium magnesium chloride ($KMgCl_3 \cdot 6(H_2O)$), calcium chloride ($CaCl_2$), calcium sulfate ($CaSO_4$), sodium bromide (NaBr), and other potassium halide salts, magnesium halide salts and calcium halide salts. Any of the salts may be present in a hydrate or any other form. In some embodiments, the additional metal halide is at least one of $MgCl_2(H_2O)_4$; $MgCl_2(H_2O)_2$; $MgCl_2(H_2O)_n$ wherein $1<n<2$; $Mg(OH)Cl$; $Mg(OH)Cl(H_2O)_{0.3}$; $Mg(OH)Cl$; $KMgCl_3(H_2O)_6$; $KMg(SO_4)Cl(H_2O)_3$; $CaCl_2(H_2O)_6$; and $CaMg_2Cl_6(H_2O)_{12}$.

In some embodiments, the salt combination comprises at least 95% sodium chloride by weight and other metal salts, as selected above.

Generally speaking, objects of the invention may comprise salts of any particle size, in any form or shape. The salt particles may be provided as agglomerates, as powders or as mixtures of different populations, e.g., of different particle forms. Typically, the salt combinations may be used as-is without imposing granulation or other processes for controlling or modifying particle size. However, in some cases, or for some uses, the physical properties of objects of the invention may be enhanced, controlled or modified by selecting particles of certain sizes or size distributions.

A desired particle size or size distribution may be achieved either by selecting particles of a desired size range, or by processing the salt particles under means providing the desired size range. Processes for achieving particles of certain sizes and for determining size distributions are known in the art. Such processes include, inter alia, crushers, grinders, ultrafine grinders, cutting machines and others.

For example, the salt may be ground or milled to a pre-determined particle size or particle distribution. Alternatively, the salt may be sieved through a perforated substrate to separate particles of desired size distributions or classified by a classifier.

Objects of the invention may comprise a narrow particle size distribution (represented by a single main Gaussian peak), wherein, for example, the size variation is between about ±1%, 2%, 3%, 4%, 5%, 6%, 7%, 8%, 9% or 10% or a broad size distribution. In some embodiments, the object comprises two or more different populations of salt particles, such that each population has a different size distribution. Where two different particle populations are present, the ratio between the populations may be between 99:0 and 0:99.

In some embodiments, the salt particle size is between 0.05 to 5 mm, 0.1 to 4 mm, or 0.3 to 1 mm. In some embodiments, the salt particle size is about 0.05, 0.1, 0.2, 0.3, 0.4, 0.5, 0.6, 0.7, 0.8, 0.9, 1, 1.5, 2, 2.5, 3, 3.5, 4, 4.5 or 5 mm. In some embodiments, about 50% of the particles are between 0.35 mm and 1 mm, and about 50% of the particles are smaller than 0.35 mm, or between 0.01 mm and 0.35 mm.

The density of objects of the invention may also depend on particle sizes. In some embodiments, the objects are characterized by having a density of between 1.7 to 2.3 $g/cm^3$ or between 1.9 $g/cm^3$ to 2.1 $g/cm^3$. In some embodiments, the objects are characterized by having a density of at least 1.70 $g/cm^3$, at least 1.80 $g/cm^3$, at least 1.85 $g/cm^3$, at least 1.90 $g/cm^3$, at least 1.95 $g/cm^3$, at least 2.0 $g/cm^3$, at least 2.1 $g/cm^3$, at least 2.2 $g/cm^3$ or at least 2.3 $g/cm^3$.

The compressed object described herein is essentially resistant to water. The resistance is reflected in at least one or more of the following:

1. resistance to dissolution and/or deliquescence when in contact with water or water vapor: namely resistance to damage caused by exposure to water or water vapor. As demonstrated herein, objects of the invention, when submerged in water, may lose a material film from their outermost surfaces within about 15 to 30 minutes, while their material cores maintains integrity and considerable compressive strength. In comparison, objects formed of only salt with no additive, completely disintegrate under the same conditions.

Additionally, when objects of the invention are exposed to water vapor the objects do not undergo deliquescence as do objects lacking the additive. In fact, the addition of the at least one additive prevents deliquescence from occurring. Thus, objects of the invention may be regarded as "non-deliquescent". These non-deliquescent objects, as defined herein, may be selected from:

2. an object constructed of a compressed salt combination comprising salt and at least one additive, the at least one additive being selected to impart the object with resistance to water and humidity by interacting in situ with at least one component present in said salt combination to afford a water-insoluble material;
3. an object constructed of a compressed salt combination comprising salt and at least one additive, the at least one additive being selected to impart the object with resistance to water and humidity, the compressed salt combination being characterized by a compressive strength of at least 20 MPa; and
4. an object constructed of a compressed salt combination comprising salt and at least one additive, the at least one additive being selected to impart the object with resistance to water and humidity, the compressed salt combination being non-deliquescent when measured at 40° C. at below 74% relative humidity.

As known in the art, "deliquescence" is a phenomenon inherent to certain materials having a tendency to undergo gradual dissolution and liquefaction by the attraction and/or absorption of moisture from the environment, e.g., air. Objects of the invention do not have this tendency. The compressed salt objects of the invention can sustain at least more than 8 hours at 74% relative humidity, RH, at 40° C., without dripping, and even higher relative humidifies, for longer periods of time. Objects free of the additive have undergone deliquescence at room temperature and much lower RHs, e.g., 35%.

5. reduced surface damage after soaking the object in water or washing the object with water, as reflected in the dimensions of the object exposed to water.
6. hydrophobic-like surface properties: even in the absence of a protective coating, for some objects of the invention, the contact angle measured for a drop of water on the surface of the object increased with time after, e.g., from the day on which the object was formed through several days after manufacture; indicating increased hydrophobicity of the object surface. Contact angles measured for a salt object that is free of at least one additive, were impossible to measure as water droplets used in the measurements immediately absorbed in the salt. This was not the case with objects of the invention which exhibited hydrophobicity reflected in contact angles ranging from 65° to 140°. In some embodiments, the contact angle is at least 65°, at least 70°, at least 80°, at least 90°, at least 100° or at least 110°.

Additionally, objects of the invention may be further characterized by increased compressive strengths, namely increased capacities to withstand loads tending to reduce size. Unlike compressive strengths of 38 MPa measured for objects lacking at least one additive, objects of the invention have exhibited strengths of at least 40, 50, 60 MPa, when measured on a 2×2×2 $cm^3$ compressed block. In comparison, a cement block of identical dimensions shows a compressive strength of about 4-5 MPa. In some embodiments, the objects have a compressive strength of between 40 MPa and 90 MPa. In some embodiments, the objects have a compressive strength greater than 40, 45, 50, 55, 60 MPa, 65 MPa, 70 MPa, 72 MPa, 74 MPa, 76 MPa, 78 MPa, 80 MPa, 82 MPa, 84 MPa or 86 MPa.

Thus, the invention further provides an object of the invention for use as a block or a board or as a building or construction unit. The salt block/board, having the high compressing strength indicated and being non-deliquescent, may be used as-is for constructing walls, floors, ceilings or any other elements in construction units, for use outdoors or indoors, thereby replacing any current utility of a cement block or element used in construction.

The objects of the invention need not be solely formed in symmetrical shapes or as blocks, but may take on any shape and size that can be formed by pressing processes, including a compression press, a roll press or any pressing method. It may be shaped as a block or a board or in any other geometrical shape, or may have a purpose-dependent shape and size.

Depending on the final intended uses, e.g., as building elements, for use in the construction of buildings, roads, ornaments, toys, household interior and exterior design elements or filling elements, the object may be associated with or comprise at least one further additive that does not deteriorate or negatively affect the improved properties of the object, as defined herein. For certain applications, either for functional purposes or for visual purposes, the objects may be coated with at least one layer or coat of a material. The object may additionally or alternatively be associated with one or more features or elements that do not comprise a salt or which are not produced by compression a volume of salt, as described herein. The association with the at least one or more features or elements may not be an irreversible association and may thus be selected from physical and chemical associations.

Where the object is coated with a coating material, the coating material may be associated with at least a surface region of the object. The association may be selected amongst chemical or physical forces, which hold the coating on the surface of the object. Non-limiting examples of such interactions include ionic bonding, covalent bonding, coordination bonding, complexation, hydrogen bonding, van der Waals bonding, hydrophobicity-hydrophilicity interactions, etc.

Thus, the present disclosure also provides an object of the invention coated on at least one surface region thereof with a film or a coating of at least one coating material.

The coated compressed salt objects and artifacts are provided with improved tensile strengths, wherein the improved tensile strengths is achieved by design of the coating layer such that it strengthens the object. In some embodiments, the tensile strength of the object is increased as compared to a non-coated compressed salt. In some embodiments, the coating also contributes to higher hardness of the object, as compared to the non-coated object. In some embodiments, the coated compressed salt object is reinforced by compressing of the salt over a scaffold of a high-tensile strength material that is stable in high salt solids, i.e., it does not corrode inside the compressed salt. A synthetic polymer net of high tensile strength may be integrated in the object to increase the overall tensile strength. A polymer or another inorganic material and salt grains are mixed before compressing to obtain a compressed composite object of increased tensile strength and hardness. In some embodiments, the physical properties of the object are further enhanced by controlling the salt particle size prior to compression, as disclosed herein, and/or by controlling the compression pressure.

The coating material may be selected to modify at least one surface property of the object, endow the object surface with additional or new properties, or act as a protective layer. In some embodiments, the coating is provided on at least a region of the object surface, e.g., complete surface, to thereby increase or improve surface properties associated with exposure to water. Such surface properties may be selected from resistance to water dissolution, increased hydrophobicity and others. In accordance with other embodiments, the coating may provide attenuation of properties, whereby an existing property may be increased, diminished, eliminated or modified in any way. The attributes may be flame retardancy, antimicrobial activity, odor absorbance, visuality, porosity, adhesivity, conductivity, resistivity, and others.

The coating layer may be transparent or colored or patterned as may be the intended use, thus maintaining structural features of the compressed object visible or masking at least a part of the structural features of the object. The object may similarly be coated with a coat or a film that can accept thereon another film of a pigment or a coloring agent for rendering the features with a desired visuality.

The thickness of the coating layer may depend on the coating material and the intended final use. In some embodiments, the coating layer is at least 1%, at least 10%, at least 20%, at least 30%, at least 40%, at least 50%, of the compressed block thickness. In some embodiments, the at least one coating layer is at most 50%, at most 40%, at most 30%, at most 20%, at most 10% of the compressed block thickness.

In some embodiments, the thickness of the coating layer is at least 0.01 mm, at least 0.05 mm, at least 0.1 mm, at least 0.2 mm, at least 0.3 mm, at least 0.4 mm, at least 0.5 mm, at least 0.7 mm, at least 0.8 mm, at least 0.9 mm, at least 1 mm, at least 2 mm or at least 3 mm.

In some embodiments, the coating material is or comprises one or more of the at least one additive defined herein.

In some embodiments, the coating material is or comprises a polymer. In some embodiments, the coating comprises a silicon based oligomer or polymer (siloxane) of the general formula $HO((R_1)Si(R_2))_nOH$, wherein $R_1$ and $R_2$ may be different or same and may be selected amongst $C_1$-$C_5$ alkyls. In some embodiments, the polymer is a $\alpha,\omega$-hydroxyl-terminated poly(dimethylsiloxane).

In some embodiments, the coating comprises a polymer, where the polymer may comprise rigid and flexible domains. In some embodiments, the polymer is formed on the surface of a compressed salt object by a sol-gel process, wherein a solution or dispersion comprising at least one sol-gel precursor, at least one catalyst and water is applied and allowed to react so that a sol-gel polymer is formed. In some embodiments, the solution comprises a solvent, wherein the solvent may be an alcohol, a ketone, a nitrile, a lactone, an ester, an ether, water, an organic acid, an organic base, or mixtures thereof. In some embodiments, the solvent comprise 1 to 6 carbon atoms. In some embodiments, the solvent is selected from methanol, ethanol, propanol, butanol, acetone, ethyl acetate, butanone, methyl ethyl ketone, methyl isobutyl ketone, furfural, gamma valerolactone, glycerin, ethylene glycol, diethylene glycol, diethyl ether, diethylene glycol dimethyl ether, 1,2-dimethoxy-ethane, methyl t-butyl ether, tetrahydrofuran, acetic acid. In some embodiments, the solvent or mixture of solvents is provided as one liquid phase before the at least one catalyst is added to the solution.

In some embodiments, water is provided at stoichiometric amounts relative to the at least one sol-gel precursor. A polymerization catalyst may be selected from an acid and a base. In some embodiments, the catalyst is selected from metal salts of carboxylic acids, for example zinc naphthenate, lead octoate, stannous acetate, dibutyltin dilaurate, dibutyltin diacetate and dioctyltin diacetate, and organo tin salts. In further embodiments, the condensation-reaction catalyst include tin compounds such as dimethyltin dineodecanoate and stannous octoate, titanium compounds such as tetra (isopropoxy)titanium, tetra(n-butoxy)titanium, tetra (t-butoxy)titanium, di(isopropoxy) bis(ethylacetoacetate)titanium, di(isopropoxy)bis(methylacetoacetate) titanium, and di(isopropoxy)bis(acetylacetonate) titanium, and the like.

In some embodiments, the at least one sol-gel precursor is a metal or a semi-metal alkoxide monomer, or a metal ester monomer, or a semi-metal ester monomer or a monomer of the formula M(R)n (P)m, wherein M is a metallic or a semi metallic element, R is a hydrolyzable substituent, n is an integer from 2 to 6, P is a non polymerizable substituent and m is an integer from 0 to 6, or partially hydrolyzed and partially condensed polymer thereof, or any mixture thereof. In some embodiments, the metallic or semi metallic element is selected from Si, Ti, Al, Zn or mixtures thereof. In some embodiments, the sol-gel precursor comprises silicate ions, e.g. sodium silicate.

In some embodiments, the coating material, e.g., a polymer, may be transparent or translucent. In some embodiments, the coating material incorporates at least one pigment. The at least one pigment may comprise, for example, at least one of inorganic particles or carbon containing particulate or non-particulate materials. In some embodiments, the at least one pigment may be dispersed evenly through the polymeric matrix or unevenly so that a pattern is visible in the polymeric matrix.

In some embodiments, the coating material is or comprises inorganic materials. Non-limiting examples of inorganic materials include metal oxides, wherein the metal may be any metal, or specific metal oxides selected from alumina, zirconia, silica, and magnesia; non-oxides metals, such as nitrides and carbides. In some embodiments, the coating material is or comprises inorganic nanoparticles or microparticles. The nanoparticles may be provided in combination with various organic polymers.

In some embodiments, the coating comprises a material that increases stability towards deliquescence, by acting as reservoir to deliquescence water during wetting and release them during drying, preventing water drops from accumulating on the walls of the object. Such coating materials may include calcium sulfates, calcium hydroxides, gypsum, hydraulic lime 3.5NHL or Cement CIII/B 42.5 N 239 (Slag cement). In some embodiments, efflock may be added to the coating material to prevent efflorescence of salt through the coating.

In some embodiments, the coating material is a salt, such as carbonate salt, hydroxide salt, phosphate salt, sulfate salt or silicate salt. In some embodiments, the coating material is a sulfate salt. In some embodiments, the coating material is gypsum (calcium sulfate in a stable dihydrate state; i.e. $CaSO_4 \cdot 2H_2O$) or any naturally occurring mineral, synthetically derived equivalent, a dihydrate material formed by the hydration of calcium sulfate hemihydrate (stucco) or anhydrite.

In some embodiments, the coating material comprises natural or synthetic fibrous materials. Non-limiting examples of fibrous material include shredded reverse osmosis (RO) membrane polymer, wood fiber, fibrillary cellulose, nano crystalline cellulose, hemp, sisal, agave and glass fibers.

As noted herein, objects of the invention are compressed objects or objects comprising a compressed salt combination, as detailed herein, having a three dimensional structure prepared by compressing a salt combination comprising the salt and the at least one additive. The compressed object is achieved, as further detailed herein below, by applying compression forces to a volume of the salt combination.

Thus, the invention provides a process for manufacturing an object of the invention comprising or consisting a compressed salt combination and at least one additive, the process comprising:

applying a pressure in the range of about 0.2 to about 2.5 ton/cm$^2$ to a volume of a salt combination comprising salt and at least one additive.

In some embodiments, the applied pressure is of at least 0.2 ton/cm$^2$, at least 0.4 ton/cm$^2$, at least 0.6 ton/cm$^2$, at least 0.8 ton/cm$^2$, at least 1.0 ton/cm$^2$, at least 1.2 ton/cm$^2$, at least 1.4 ton/cm$^2$, at least 1.6 ton/cm$^2$, at least 1.8 ton/cm$^2$, at times at least 2.0 ton/cm$^2$ or at least 2.2 ton/cm$^2$.

In some embodiments, the salt combination is in the form of a solid composition or in the form of a slurry. Where the salt combination is in the form of a slurry, the process may further comprise pre-treating the salt composition by filtering and/or drying the slurry prior to compression to obtain a dried or semi-dried salt combination.

In some embodiment, the process further comprises pre-treating the salt combination by adjusting the pH. In some embodiments, the process comprises pre-treating the salt combination by purging with $CO_2$ gas, so as to produce carbonates. In other embodiments, the process comprises pre-treating the salt combination with sodium carbonate.

In some embodiments, the process comprises pre-treating the salt combination, in the presence or absence of the at least one additive, under means or conditions for reducing the salt particle size. In some embodiments, the process comprises mixing the salt combination and the at least one additive, in solid form, and treating the combination for reducing particle size. The reduction in particle size may be achieved by any method known in art or any industrial process, such as by grinding or milling.

In some embodiments, the process comprises maintaining the compressed object under controlled humidity conditions for a period of time sufficient to dry the object. The conditions may include a temperature of between 30 and 60° C., relative humidity (RH) of between 34 and 75%, for a period of between 24 and 72 hours. The conditions may also include drying the object under ambient conditions at a temperature of at least 30° C.

In some embodiments, the object is treated in a moisture oven. In some embodiment, the humidity in the moisture oven is about 34, 38, 50, 55, 60, 65, 70, 75% RH. In some embodiments, the temperature of the moisture oven is higher than 30, 35, 40, 45, 50, 55, or higher than 60° C.

Once an object according to the invention is formed, it may be post-treated, as detailed herein, e.g., by forming a coating layer on the surface of the object. Thus, a process for manufacturing an object according to the invention may further comprise applying a coating on a surface region of the object. In some embodiments, coating may be applied by dip coating, spray coating, brushing, spin coating, roller coating or any other means suitable to coat an object of a particulate shape and size.

In some embodiments, the process comprises drying of the coating material, by any drying means available to the practitioner, e.g., by hot air blowing or heating, or by induced evaporation. In some embodiment, the coated article is heated briefly, i.e. for 2, 3, 4, 5, 6, 7, 8, 9, 10 minute at a temperature of about 100° C., under atmospheric pressure, or at a lower temperature if pressure is reduced, to cause faster evaporation of water from the object surface. In some embodiment, the coating is allowed to dry at ambient temperature and pressure for further 12, 15, 18, 20, 24 hours to afford a solid coating.

In some embodiments, the coating material is or comprises gypsum. In some embodiments, the process comprising mixing gypsum with water to form a flowing paste that cures over time and form solid gypsum. In some embodiments, the ratio of gypsum powder to water in the mixture is 0.5:1, 0.8:1, 1:1, 1.1:1. 1.2:1, 1.25:1, 1.30:1, 1.35:1, 1.40:1 or 1.5:1. In some embodiment, the ratio of gypsum powder to water in the mixture is at least 0.8:1. In some embodiment, the ratio of gypsum powder to water in the mixture is less than 1.4:1.

In some embodiment, a curing accelerator may be added. In some embodiments, the ratio of the curing accelerator to gypsum powder is 0.01, 0.02, 0.03 or 0.04 to 1, wt/wt. In some embodiments, a commercial gypsum accelerator is used, such as $CaSO_4 \cdot 2H_2O$ or commercial products sold under the USG™ Accelerators brand, the Gold Bond® brand, the Casonic® brand and others.

In some embodiments, the coating material comprises gypsum and glass fibers, the glass fibers being in chopped form, as strands.

In some embodiments, the coating material comprises gypsum and at least one of wax, asphalt or silicon based polymers.

In some embodiments, the gypsum may be treated with at least one siloxane polymer as an hydrophobizing agent. The mixture may be prepared by reacting the polymer with at least one catalyst. Both the siloxane and the catalyst may be in the form of emulsions, which are stable under the temperature and electrolyte conditions of the wet gypsum mixture. The siloxane is adapted to cure at the core temperature achieved during the final drying of the product. It should be noted that both emulsions should be stable in the presence of the various additives which are used to regulate the crystallization of the hemi hydrate and the various accelerators or retarders which are used to adjust the process by which the rehydration of the gypsum occurs, as well as not interfering with the additives. The siloxane emulsion is an aqueous emulsion of one or more such siloxanes, which is stable in a wet gypsum mixture under the conditions of the process and which maintain the calcium sulfate hemihydrate crystals present therein. The siloxane emulsion comprises a siloxane, which is adapted to cure or polymerize to a silicone during the board-drying step to provide improved water resistance to the finished product. The catalyst emulsion is similarly an aqueous emulsion of one or more catalysts, which is stable in a wet gypsum mixture under the conditions, and which maintains calcium sulfate hemihydrate crystals. The catalyst emulsion comprises a catalyst, which is adapted to promote the cure of the siloxane to a silicone during the drying step, to provide improved water resistance to the finished product. The siloxane as used herein is generally a fluid linear hydrogen-modified siloxane, optionally a cyclic hydrogen-modified siloxane. Such siloxanes are capable of forming highly cross-linked silicone resins. Typically, the linear hydrogen modified siloxanes useful in the practice of the present invention comprise those having a repeating unit $(OSiHR)_n$, wherein R represents a hydrocarbon radical, and may be saturated or non-saturated, may be linear or cyclic; and end block units of the general formula $SiR'_3$, wherein R' may be identical or different to R. In some embodiments, n is from 10 to 100, or from 20 to 50 or from 30 to 40, or about 35. In some embodiments, the viscosity of the polymer at 25° C. is 10-50, 15-25 mPa·s.

In some embodiments, the coating material is gypsum in combination with a polymethylhydrogensiloxane (PDMS) precursor used to prepare a cured PDMS polymer. Such precursors may be commercially available, e.g. Silres® BS Poweder S, Silres® BS94 (Wacker Chemie AG) and other grades of the Silres® line, XIAMETER® MHX-1107 FLUID or Dow Corning® MHX-1107 FLUID (Dow Corning), SiSiB® PF2020 FLUID (Power Chemical Corporation Ltd.) and from additional suppliers. These polymers can be cured by heating the formed gypsum coating to 100-200° C., 120-175° C., and/or by allowing them to cure over 1, 5, 10, 20 or 30 days. Curing may be accelerated by adding a catalyst into the wet gypsum formulation, the catalyst may be selected from zinc octoate, iron octoate, dibutyl tin laurate and tin octoates.

In some embodiments, the process comprises application of a paint onto the coated blocks.

In some other embodiments, a coating is formed by applying lime on a surface region of the object. In other embodiments, a mixture of hydraulic or non-hydraulic hydrated air lime and optionally additional binding material, e.g., calcium silicate, sodium silicate or potassium silicate, may be applied as a semi-fluid material that is coated over the object. Hydraulic or non-hydraulic hydrated air lime can also be incorporated in the salt object as a binder.

The present invention also provides use of the objects of the invention, when in a block form, either coated, partially coated or not coated, as a building block in a variety of applications, e.g., construction. In some embodiments, a cementing or an adhesive material is applied between adjacent blocks to ensure adhesion. Surprisingly, it was found that many commercial gypsum formulations that were optimized to be applied on different building materials, such as cement bricks and walls, show good adherence and stability when applied on objects of the invention. The blocks may be used as construction materials for walls and other structures designed to withstand explosion. Structures designed to protect humans from explosions are often built underground. In such cases, a plastic sheet or layer may be designed to rap around the salt object to further protect it from water or humidity.

The present disclosure also provides use of the objects of the invention as humidity modifiers, for example in a closed space, e.g., a room. In some embodiments, the compressed salt object is designed to comprise at least two parts that are fixed one above the other, wherein the upper part comprises a compressed block that adsorbs moisture from the environment and the lower part comprises a reservoir of sodium carbonate salt, which absorbs and solidifies the liquid that drips from the upper object. The lower part can be exchanged for a fresh one when exhausted, the used up solid comprising predominantly insoluble carbonate and sulfate salts that can be discarded as regular waste. This object may be used as a decorative object that can be used to modify the relative humidity in a room such that if the humidity is high it will get collected at the lower part of the decorative object, while enriching the air of the room with salt ions, which is believed to have health advantages.

Objects of the invention may be cemented or associated to each other by a variety of ways to afford a variety of modular structures with properties being the same or different along the constructed structures. Objects of the invention, such as blocks, may be cemented to each other such that each of the blocks or each group of several blocks differs from another block or another group of blocks in at least one property. Such properties may be size, shape, color, material composition (salt and additive), population of salt particles, distribution or density of particles or additives, presence or absence of a coating, transparency, absorbance of or resistance to water, and others. Thus, the invention further provides a modular structure comprising at least one object of the invention, each object associated to at least one object in the structure by a cementing or an adhesive material, as disclosed herein.

In some embodiments of the invention, a salt combination used in objects or structures of the invention comprises at least one of 22% wt sodium; at least 53% wt chloride; at least 0.1% wt magnesium or calcium; at least 0.05% wt potassium; at least 0.05% wt bromine; and at least 0.05% wt sulfate, wherein the amount of magnesium chloride or calcium chloride is less than 0.001% wt.

The invention further provides an object comprising a salt combination, wherein the combination comprises at least one of 22% wt sodium; at least 53% wt chloride; at least 0.1% wt magnesium or calcium; at least 0.05% wt potassium; at least 0.05% wt bromine; and at least 0.05% wt sulfate, wherein the amount of magnesium chloride or calcium chloride is less than 0.001% wt.

In some embodiments, the salt combination comprises of 22% wt sodium; at least 53% wt chloride; and at least 0.1% wt magnesium or calcium; as well as at least one or more of at least 0.05% wt potassium; at least 0.05% wt bromine; and at least 0.05% wt sulfate, wherein the amount of magnesium chloride or calcium chloride is less than 0.001% wt.

The invention further provides a loose granulate or powder composition comprising:
  (i) at least 22% wt sodium;
  (ii) at least 53% wt chloride; and
  (iii) at least 0.1% wt magnesium or calcium
wherein the amount of magnesium chloride or calcium chloride is less than 0.001% wt. The composition is characterized by ICP (on a dry matter basis), as demonstrated hereinbelow.

In some embodiments, the composition is suitable for compressing into a stable object, e.g., by application of pressure.

In some embodiments, the composition further comprises one or more of:
  (iv) at least 0.05% wt potassium;
  (v) at least 0.05% wt bromine; and
  (vi) at least 0.05% wt sulfate
as calculated on dry matter basis.

In some embodiments, the composition has no significant endotherm peaks between 50 and 250° C., as tested by Differential Scanning calorimetry (DSC) in a nitrogen atmosphere.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Non-Limiting Examples

Example 1—General Procedure for Coating of a Model Pellet Made of the Dead Sea Salt (DSS) by Gypsum A salt from the Dead Sea was collected on the beach of the sea. The salt was oven dried at 120° C. for ~2 hours. 0.5 g salt was presses into pellet using a die for making IR disks. A PIKE press was used at 3.5-4.6 ton pressure to form a solid pellet. To prepare the gypsum coating, about 1 g of PDMS (SA #481955, MW 2500-2800) was mixed with the water. 0.5 g $CaSO_4 \cdot 2H_2O$ (SA #31221) was grounded and mixed with 24.5 g commercial calcined gypsum bought at the local hardware shop. The dry mixture was added over 30 s into the water, then mixed with a spatula for 60 s and poured into a vial. Salt pellets were dipped for 10 s into the mixture and pulled slowly, once it was viscous enough. Samples were either allowed to dry at r.t., or first heated in an oven to 100° C. for 5 minutes, then allowed to dry at r.t. for 24 hours. Some of the dried samples were dipped into a commercial paint suitable for outdoor painting (Tambur, blue 487-438 paint for walls).

Example 2—SEM Image of a Pellet Coated with Gypsum Comprising PDMS

Figure 1A:
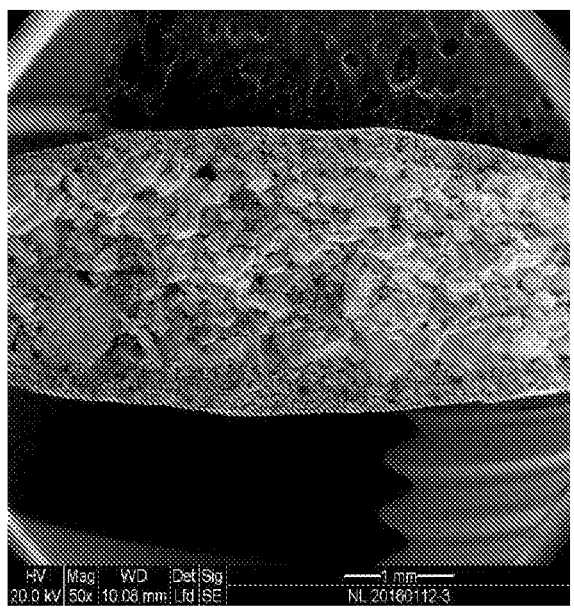
FIGS. 1A-B provide SEM images of a pellet of a Dead Sea compressed salt coated with gypsum-PDMS coating according to some embodiments of this invention at magnification of ×50.
Figure 1B:
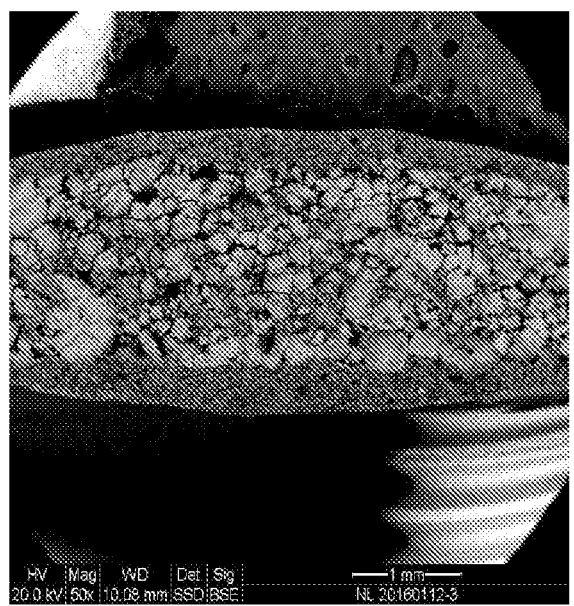
Figure 2A:
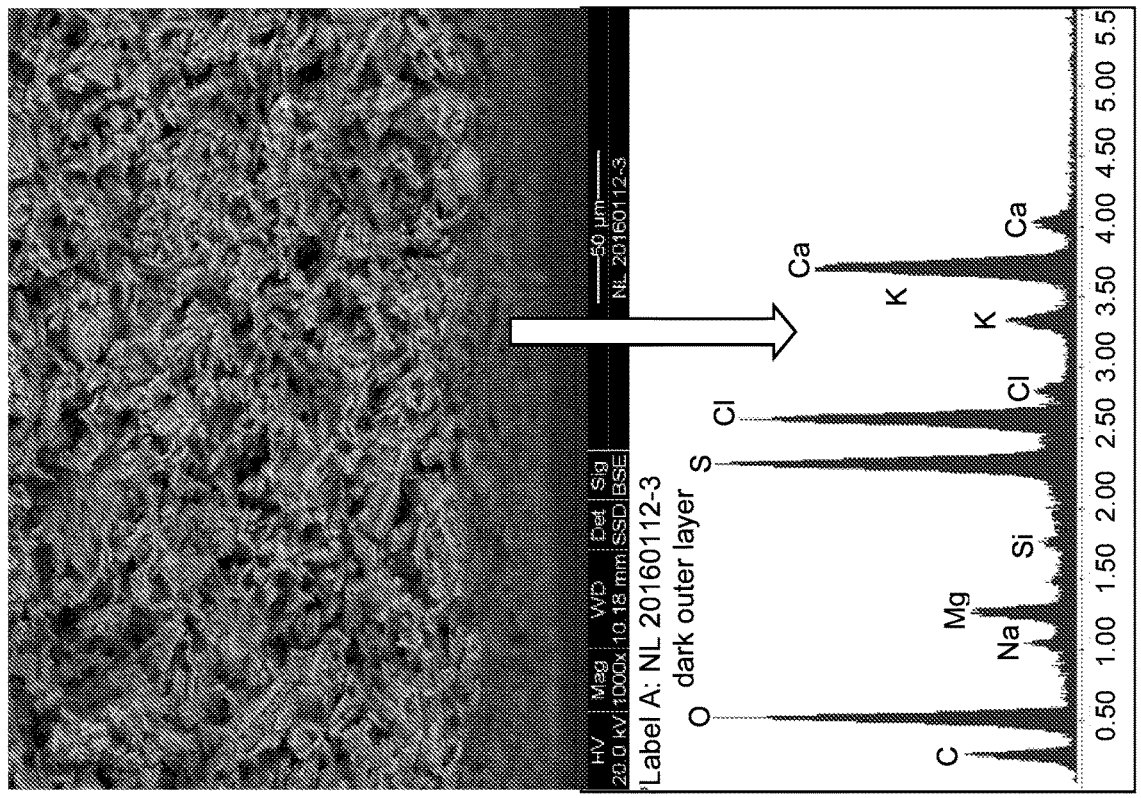
FIGS. 2A-B provide further magnifications of the SEM image of FIGS. 1 to ×100, and elemental analysis of the layers observed in back scattering.
Figure 2B:
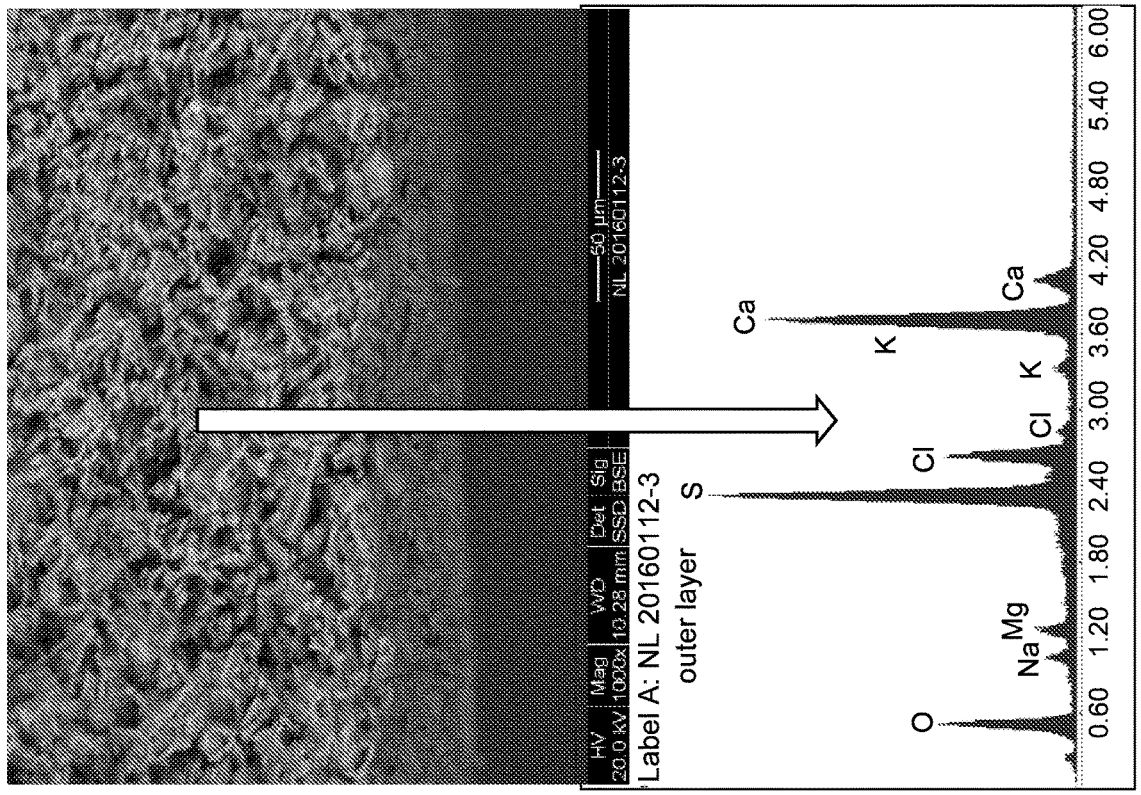

A pellet was carefully cut by hand in its middle. The sample was characterized in an environmental SEM microscope Quanta 200 (FEI Company). Sample NL20160112-3 is provided in FIG. 1 and FIG. 2. Clear boundaries were observed between the core salt and the gypsum coating at ×50 magnification in FIG. 1, both in direct mode, A, and in back scattering, B. Further magnification of the coating layer, ×100, shown in FIG. 2, shows a clear darker area comprising PDMS at the air interface of the coating and brighter inner layer of the coating, as confirmed by elemental analysis for gypsum, A, and a mixture of gypsum and PDMS, B.

Example 3—SEM Image of a Pellet Coated with Gypsum Comprising PDMS

Figure 3A:
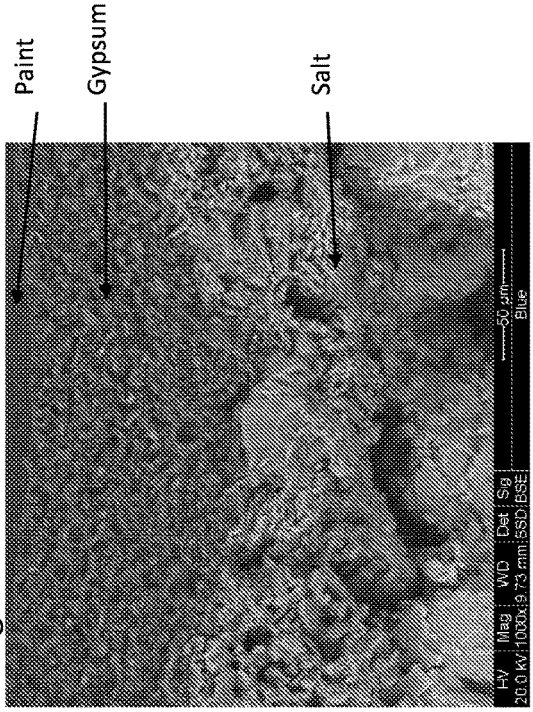
FIGS. 3A-D are SEM images of a pellet of the Dead Sea compressed salt coated with a first layer of gypsum and a second layer of a commercial outdoor paint.
Figure 3B:
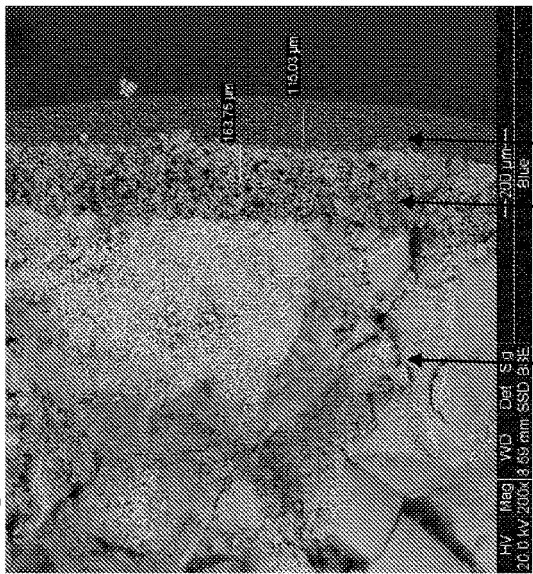
Figure 3D:
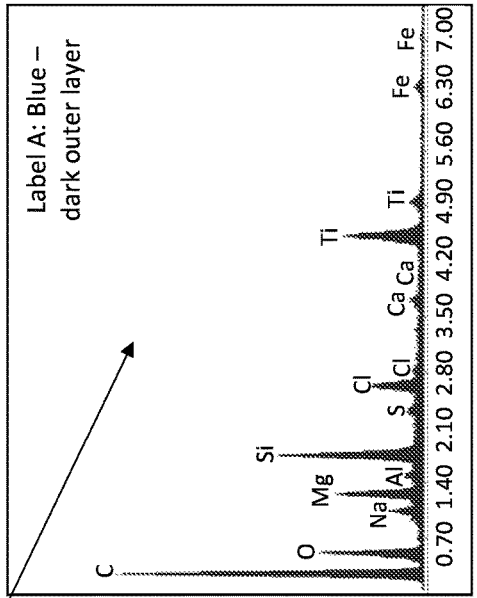
Figure 3C:
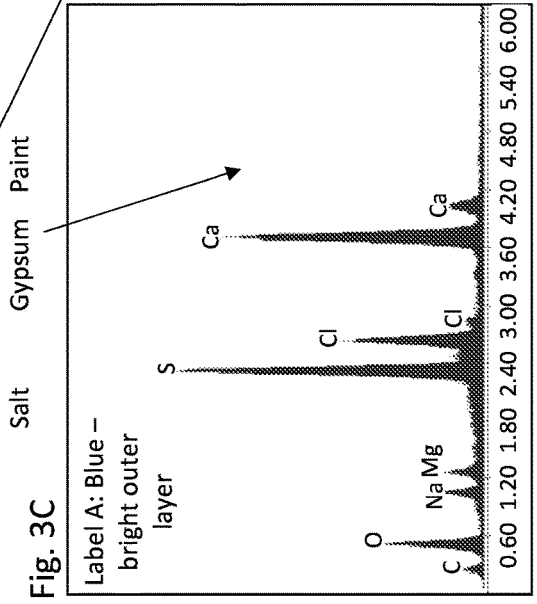
Figure 4A:
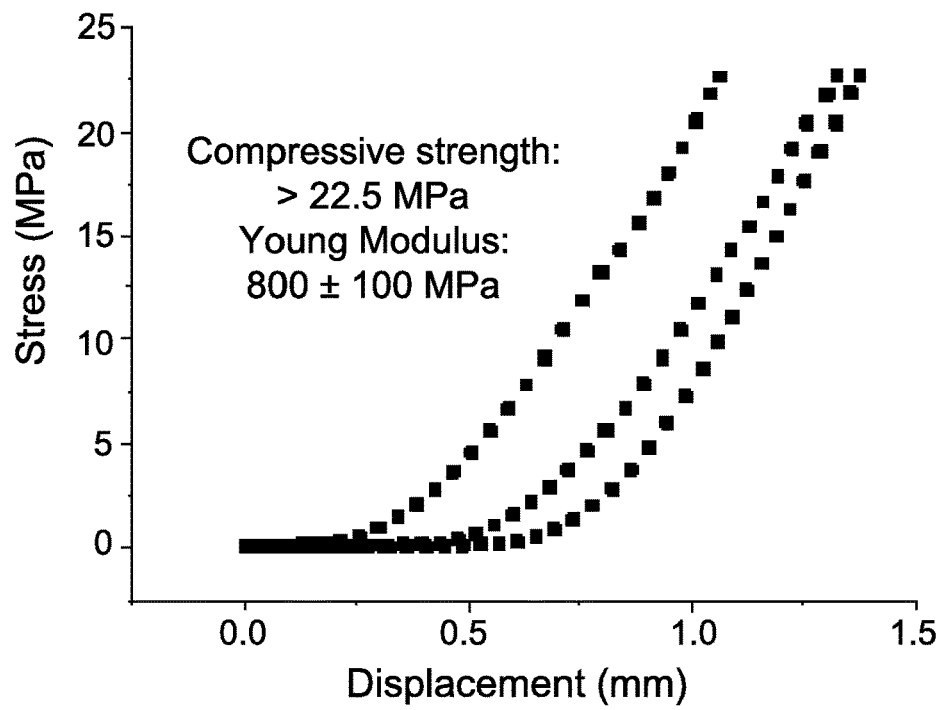
FIGS. 4A-F show compressive strength testing of compressed salt cubes, comparing Dead Sea salt (FIG. 4A) to treated salt by several treatments (FIGS. 4B-F) to overcome deliquescence.
Figure 4B:
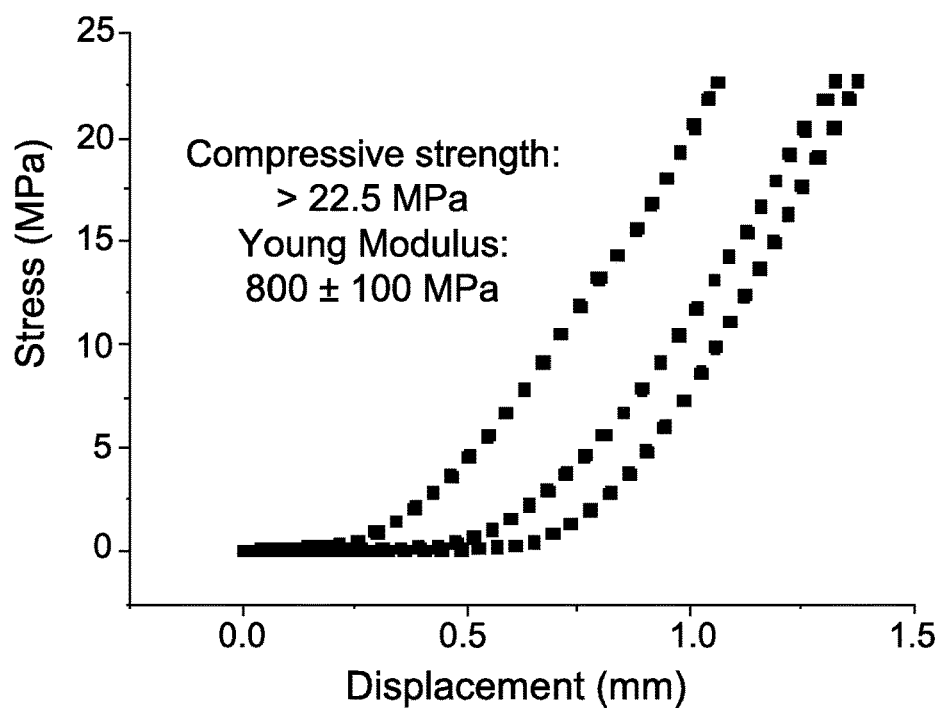
Figure 4C:
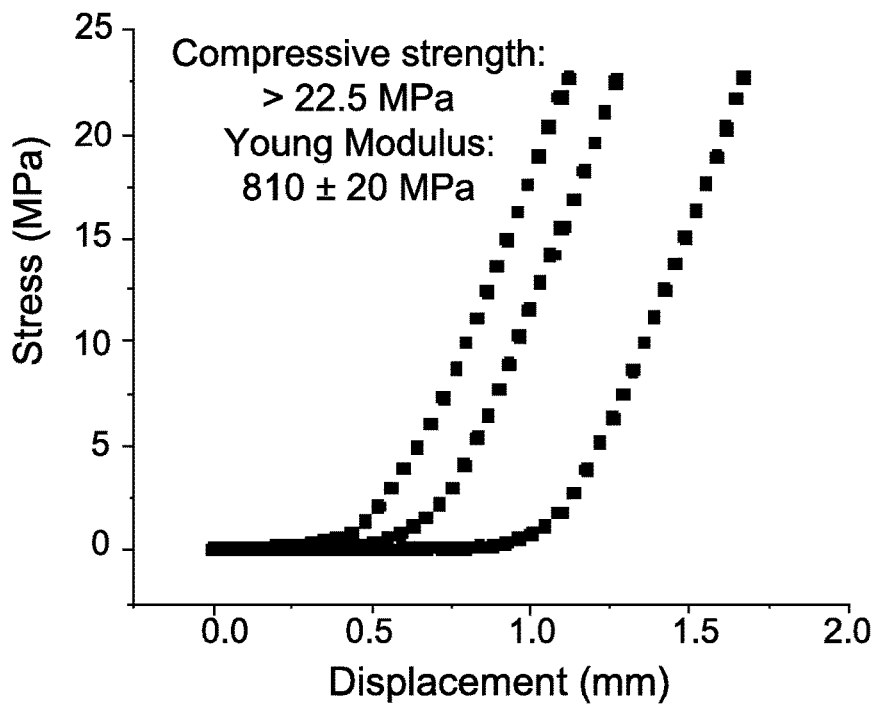
Figure 4D:
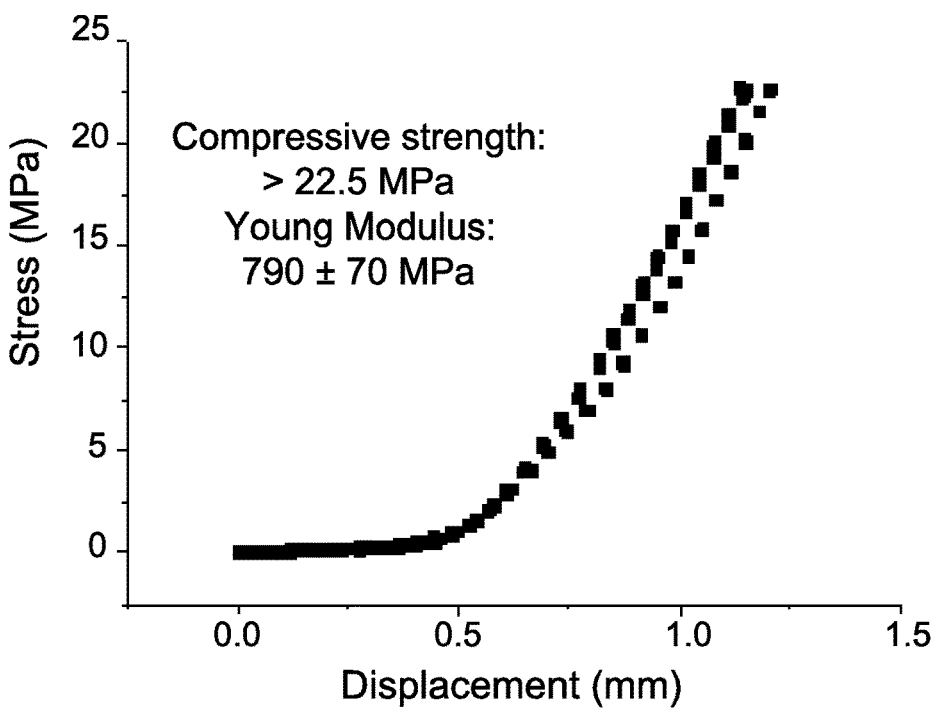
Figure 4E:
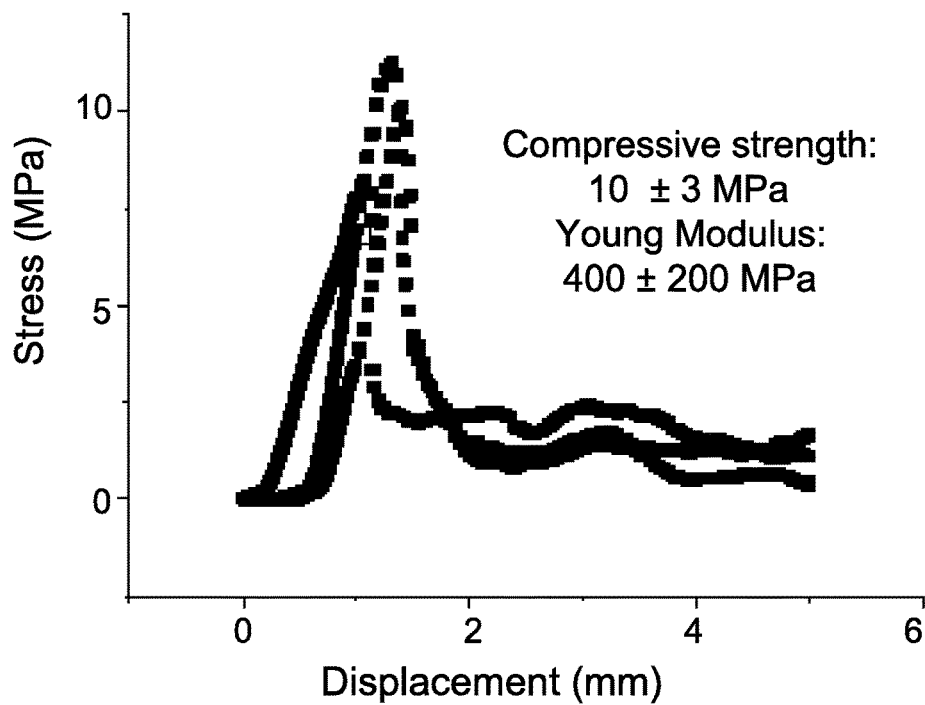
Figure 4F:
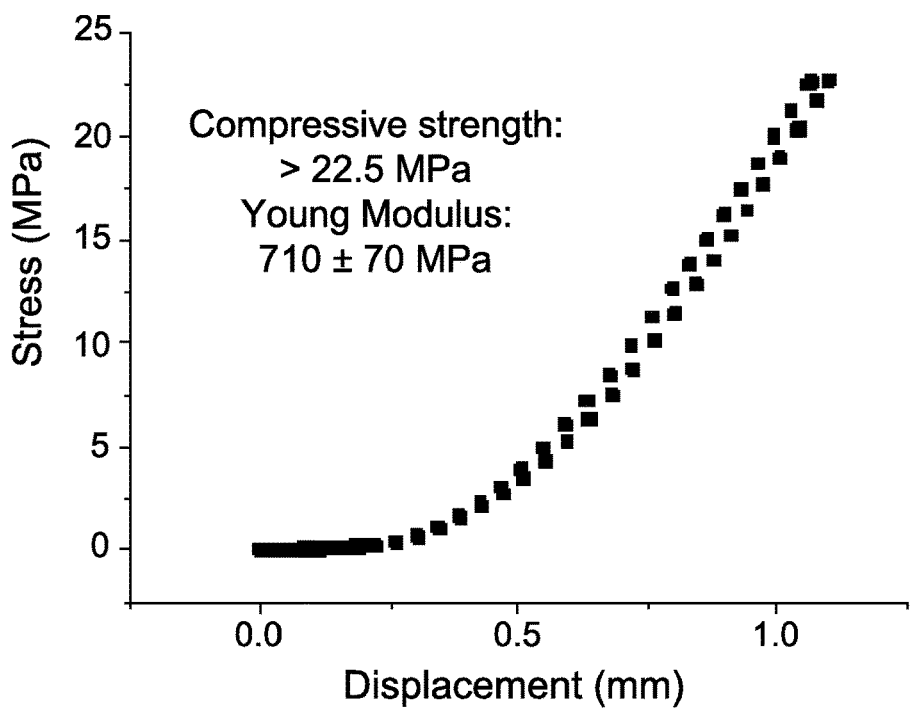

A sample prepared according to Examples 1 and 2 was coated with a commercial blue paint by dipping. The coated pellet was carefully cut by hand at its middle, and characterized by SEM. The three layers are clearly seen at ×200 magnification in FIG. 3A, and further at ×1000 magnification in FIG. 3B. Chemical analyses shown in FIG. 3C and 3D confirm the compositions of the layers to be gypsum and paint respectively.

Example 4—Deliquescence and Prevention of Deliquescence Phenomena

A) Control: Oven dried DSS (120° C., 2 h) was compressed into a 20×20×20 mm$^3$ (z direction±1 mm) cubes (8 ton pressure for 5-10 minutes at r.t.). Volume density of the cube was 1.875 g/cm$^3$. Sample cubes were left on a petri dish at open air, control samples were kept in a desiccator. After 3-4 days, the samples held at open air became visually wet, and a pool of water was collecting under them, while samples held in a desiccator were stable. The samples in the petri dish eventually lost their integrity over days, and partially dissolved. Further samples were coated with gypsum as described in Example 1. After drying the coating, a bi-component epoxy was applied to glue the cube to a wooden stick. Once dried, the stick was used to hang the coated salt cube above a laboratory beaker, such that water would drip from the cube to the beaker but the cube is maintained not in contact with the water. A pool of water was collected under the cube, but the cube maintained its shape and integrity for months.

B) Pretreatment by $Na_2CO_3$ dissolved in water: a solution was prepared by dissolving 65 g of $Na_2CO_3$ in 250 ml deionized water. 25 ml of the resulting solution was thoroughly mixed by hand with 30 g oven dried and ground with DSS. The resulting moist salt was dried again in the oven, and then pressed in the same manner as in sample (A). Samples left on the bench in a petri dish for weeks did not show any deliquescence.

C) Pretreatment by $Na_2CO_3$ dissolved in water: a solution was prepared by dissolving 65 g of $Na_2CO_3$ in 250 ml deionized water. 10 ml of the resulting solution was thoroughly mixed by hand with 30 g oven dried and ground with DSS. The resulting moist salt was dried again in the oven, and then pressed in the same manner as in sample (A). Samples left on the bench in a petri dish showed some deliquescence, evident by formation of some water in the petri dish, the amount was much smaller as compared to the control sample, showing that partial ion exchange occurred.

Example 5—Prevention of Deliquescence Phenomena by Powder Mixing 6.5 g $Na_2CO_3$ was grounded in a kitchen grinder with 30 g of oven dried and ground DSS. The resulting fine powder was allowed to stand in a petri dish on the bench. After few days under exposure to humidity in the room, the powder agglomerated, showing no deliquesce, i.e. no water was visible.

The powder mix was pressed in the same manner as in Example 4. Samples left on the bench showed wetting for the first ~3 days, but then dried up. This is attributed to in-situ ion exchange occurring once moisture is absorbed, resulting in stabilizing of the cube once $MgCO_3$ was formed.

Example 6—Stabilized Formulation of DSS 1 g of sodium stearate was added to 20 ml of water and the mixture was heated and stirred until a clear solution was obtained. 30 g of dried (120° C.) DSS was dissolved in 50 ml of water and the solution was heated at the same temperature of the sodium stearate solution. The hot soap solution of sodium stearate was added to the hot salt solution under stirring, causing visible precipitation of calcium and magnesium stearate. The residual calcium and magnesium in the salt solution was precipitated as carbonate by addition of 25 ml of 260 g/L sodium carbonate solution. Water was evaporated on hot plate and the salt obtained was completely dried in oven at 120° C.

Example 7—Stabilized Formulation of DSS 1 g of sodium stearate was added to 20 ml of water and the mixture was heated and stirred until a clear solution was obtained. 30 g of DSS was suspended in the water and mixed for 1 h at 50-80° C. 6.5 g $Na_2CO_3$ was added and mixed with the slurry for additional 30 minutes. The solid was collected and dried.

Example 8—Compression Strength Testing of Compressed Salt Cubes 15 grams of salt were compressed in a die, where the area was 20×20 mm$^2$, by pressing for 5 min at 2 ton/cm$_2$. The height of the pressed cubes was 17.7 to 20.5 mm. The salt treated according to Examples 4, 5, 6 and 7 were all compressed successfully, as well as untreated Dead Sea salt. All compressed cubes were physically stable and could be handled. 3 cubes of each treatment were tested for compression strength in an Instron model 4500-10 KN—tensile compressive strength tester, 10 KN cell. The results are presented in FIG. 4. Untreated salt cubes could not be broken under the maximum applied pressure of this instrument, i.e. their compressive strength was greater than 22.5 mPa and Young modulus of 800+100 mPa. Stabilizing according to Example 5 followed by incubation of the salt on the bench yielded cubes with Young modulus of 700±100 mPa (Treatment A); incubating the same in a moisture oven at 30° C., 50% RH for 3 days yielded cubes with Young modulus of 810±20 mPa (Treatment B); stabilizing the salt according to Example 4B yielded cubes with Young modulus of 790±70 mPa (Treatment C), all three conditions showed compressive strength greater than 22.5 mPa. Only treatment according to Example 5, followed by incubating the salt in a closed dry contained yielded weak cubes having Young modulus of 400±200 mPa and compressive strength of 10±3 mPa (Treatment D). Stabilizing and hydrophobizing according to Example 6 also yielded cubes having Young modulus of 710±70 mPa, and compressive strength greater than 22.5 mPa (Treatment E).

Example 9—Stabilized Formulation of DSS

Sodium stearate (0.4-1.6% wt/DSS wt) was dissolved in 83 ml DI water at 75° C. and added to 100 g DSS powder (ca. 95% NaCl) while stirring. 16.6 ml Sodium carbonate solution (65 g $Na_2CO_3$ in 250 ml DI water) was added to the DSS slurry until pH was 10 or higher. A solution of 1.6 g $CaCl_2$ dissolved in 10 ml water was added while stirring, followed by a solution of 2.05 g $Na_2SO_4$ dissolved in 10 ml water. The slurry was heater to 80° C., then dried at 50° C. and ground.

Example 10—Stabilized Formulation of DSS

Sodium stearate (0.4-1.6% wt/DSS wt) was dissolved in 83 ml DI water at 75° C. and added to 100 g DSS powder (ca. 95% NaCl) while stiffing. 16.6 ml Sodium carbonate solution (65 g $Na_2CO_3$ in 250 ml DI water) was added to the DSS slurry until pH was 10 or higher. A cementing agent was added while stiffing, see Table 1. The slurry was dried at 50° C. and ground.

TABLE 1 cementing agents added to the formulation.

| Type | Amount, g | Water, ml |
|---|---|---|
| Gypsum | 2 | 20 |
| Hydraulic Lime NHL 3.5 | 2 | 20 |
| Cement CIII/B 42.5N 239 (Slag cement) | 2 | 20 |

Example 11—Stabilized Formulation of DSS

Sodium stearate (0.4-1.6% wt/DSS wt) was dissolved in water (25 ml per 30 g DSS) at 75° C. and added to the DSS powder (ca. 95% NaCl) while stiffing. Sodium carbonate solution (65 g $Na_2CO_3$ in 250 ml water) was added to the DSS slurry until pH was 10 or higher (ca.17 ml per 100 g DSS). 19 ml of saturated NaCl solution was added with stiffing. The slurry was filtered on a Buchner using Whatman No. 1 filter paper, the solid was collected and dried.

Example 12—Stabilized Formulation of DSS

Sodium stearate (0.4-1.6% wt/DSS wt) was dissolved in 83 ml DI water (25 ml per 30 g DSS) at 75° C. and added to the DSS powder (ca. 95% NaCl) while stirring. 16.6 ml Sodium carbonate solution (65 g $Na_2CO_3$ in 250 ml DI water) was added to the DSS slurry until pH was 10 or higher. 0.1-5% sodium silicate solution (24.5 g NaOH and 49 g of $SiO_2$ dissolved in 100 ml DI water) was mixed with 4 times as much HCl solution (ca. 1.5%). The mixture was added to the slurry while stiffing. The slurry was dried at 120° C.

Example 13—Stabilized Formulation of DSS

Trimethylsiloxy silicate (TMSS, 0.25 g) was dissolved in 25 ml ethanol at 65° C. Sodium stearate (0.25 g) was added to this solution. The resulting ethanol solution was added to DSS (15 g) at 70=75° C. Once ethanol starts to boil, 12.5-25 ml of a sodium carbonate solution (65 g $Na_2CO_3$ in 250 ml DI water) is added while stiffing. The resulting slurry is dried at 100° C. for 1 hour.

Example 14—TMSS Coating

A pellet prepared according to Example 12 was coating with TMSS by dipping for 1.5 minute into a solution of TMSS in ethanol (1 g TMSS in 8 ml ethanol).

Example 15—Properties of Compressed Objects of Different Formulations in Contact with Water Properties of formulated compressed objects were evaluated by 3 methods: (i) measurement of the contact angle of a drop of water was conducted using a Rame-hart instrument, model 100-00 goniometer, USA; (ii) the time needed for the object to absorb a drop of 10 microliter of water was measured; (iii) a compressed disk of 0.5 g was immersed in 50 ml DI water, the conductivity of the water was measured and the amount of salt dissolved was calculated (assuming all the dissolved salt is NaCl). The results are summarized in Table 2.

TABLE 2

Properties of different formulations and treatments of compressed DSS samples.

| | Salt composition | | | | Stearate % wt | hexadecane sulfonic acid salt % wt | hexadecyl phosphonic acid % wt | TMS % wt | Curing | | Water penetration time, min | Conductivity at 20 min. mS | Wt loss at 20 min. mg |
|---|---|---|---|---|---|---|---|---|---|---|---|---|---|
| DSS. % wt | NaCl, % wt | Mg, % wt | Ca, % wt | $CO_3$, % wt | | | | | time. wk | Contact angle, ° | | | |
| 97.9 | 74.6 | 0.6 | 0.2 | 2.1 | 0 | — | — | — | — | 34.4 | 5 | — | — |
| 97.8 | 74.5 | 0.6 | 0.2 | 2.1 | 0.1 | — | — | — | — | 48.05 | 8.5 | — | — |
| 97.7 | 74.4 | 0.6 | 0.2 | 2.1 | 0.2 | — | — | — | — | 63.03 | 14.5 | — | — |
| 97.5 | 74.2 | 0.6 | 0.2 | 2.1 | 0.4 | — | — | — | — | 60.5 | 20 | — | — |
| 97.1 | 73.9 | 0.6 | 0.2 | 2.1 | 0.8 | — | — | — | — | 70.78 | 34 | — | — |
| 96.3 | 73.3 | 0.6 | 0.2 | 2.1 | 1.6 | — | — | — | — | 74.85 | 40 | 4249 | 138.1 |
| 96.3 | 73.3 | 0.6 | 0.2 | 2.1 | 1.6 | — | — | — | 2 | 129.9 | 60 | — | — |
| 96.3 | 73.3 | 0.6 | 0.2 | 2.1 | — | 1.6 | — | — | — | 45.28 | 35 | 5771 | 187.6 |
| 96.3 | 73.3 | 0.6 | 0.2 | 2.1 | — | — | 1.6 | — | — | Cannot measure | 30 | 6769 | 220 |
| 96.3 | 73.3 | 0.6 | 0.2 | 2.1 | — | — | — | 1.6 | — | 28 | 5 | 7015 | 228 |
| 94.8 | 72.2 | 0.6 | 0.2 | 2.0 | 1.6 | — | — | 1.6 | — | 68 | 90 | 4800 | 156 |
| 93.6 | 72.2 | 0.6 | 0.2 | 3.2 | 1.6 | — | — | 1.6 | — | 79.6 | 95 | 3830 | 124.5 |
| 92.8 | 72.2 | 0.6 | 0.2 | 4.0 | 1.6 | — | — | 1.6 | — | 79.2 | 100 | 3800 | 123.5 |
| 94.8 | 72.2 | 0.6 | 0.2 | 2.0 | 1.6 | — | — | 1.6 | 2 | 78.05 | 120 | 4300 | 139.8 |
| 94.8 | 72.2 | 0.6 | 0.2 | 3.2 | 1.6 | — | — | 1.6 | 2 | 100.35 | 150 | 2940 | 95.6 |
| 92.8 | 72.2 | 0.6 | 0.2 | 4.0 | 1.6 | — | — | 1.6 | 2 | 94.05 | 150 | 3210 | 104.3 |
| 94.8 | 72.2 | 0.6 | 0.2 | 2.0 | 1.6 | — | — | 1.6 | 4 | 106.2 | — | 4020 | 130.7 |
| 94.8 | 72.2 | 0.6 | 0.2 | 3.2 | 1.6 | — | — | 1.6 | 4 | 91 | — | 2280 | 74.1 |
| 92.8 | 72.2 | 0.6 | 0.2 | 4.0 | 1.6 | — | — | 1.6 | 4 | — | — | 860 | 28 |
| 94.8 | 72.2 | 0.6 | 0.2 | 3.2 | 1.6 | — | — | 1.6 | 3 + (TMS coating) | 120 | — | 299 | 9.7 |

As shown in Table 2, the various treatments improve the durability of the compressed sample to direct contact with water by the 4 types of tests outlined above.

Example 16—Cementing Compress Salt Objects

TABLE 3 cementing formulae of cementing agents capable of cementing together objects

| Type | Amount, g | Water amount, ml | Application method |
|---|---|---|---|
| Gypsum | 2 | 1 | Add gypsum to water over 30 s, mix for 1 minute, apply paste and allow to dry for 5 days. |
| Hydraulic Lime NHL 3.5 | 2 | 1 | Apply paste, press together for 28 days curing |
| cement CIII/B 42.5N 239 (Slag cement) | 8 | 3 | Apply paste, press together for 28 days curing |

Example 17—Stabilized Formulation of DSS 10 ml of $Na_2CO_3$ solution (26% wt/wt) was added to DSS granules (as received from The Dead Sea Works). The slurry was mixed by a mechanical stirrer until uniformity, pH of the free liquid ≥10. Optionally, magnesium stearate was added (0.4-1.6% wt/DSS wt) and mixed well. Optionally, calcium stearate (0.4-1.6% wt/DSS wt) was added and mixed well. The wet solid was dried in an oven for 0-24 h at 125° C.

Example 18—Durability to Water

Cubes of 2×2×2 $cm^3$ were compressed from DSS as received, or formulated according to Example 17. Some of the cubes were fully submerged in water for 15 min, then were taken out and allowed to dry. Some of the cubes were held in a humidity chamber at 80% RH, 37° C. for 3 days. The compressive strength of the cubes was tested on an Automax compressive stress testing machine. Table 4 summarizes the ultimate compressive strength reports as stress at break (MPa).

It is observed that (a) the formulated compressed salt shows a much higher compressive strength than a reference cement cube; (b) even after submerging the cube in water or exposing it to high humidity, the reduced compressive strength is still significantly higher than that of the cement reference.

TABLE 4 compressive strength measurements of various native and formulated DSS cubes, dry and after exposing them to liquid water or to humidity.

| Sample | Treatment | Ultimate Compressive Strength, MPa |
|---|---|---|
| DSS, coarse | Dry | 36.7 |
| DSS, coarse | Submerged | 4.3 |
| DSS, fine grinding | Submerged | 11.3 |
| Formulated, medium grinding | Dry | 50.5 |
| Formulated, coarse | Dry | 41.7 |
| Formulated, coarse | Humidity | 27.1 |
| Formulated, coarse | Submerged | 14.9 |
| Cement reference | | 4 |

It is observed that water or humidity exposure reduces the ultimate compressive strength the cube can take before breaking, but at all cases the compressive strength is about 3 fold higher compared to a cement cube of same dimensions.

Example 19—Active Wall to Support Controlled Humidity Rooms

Figure 5:
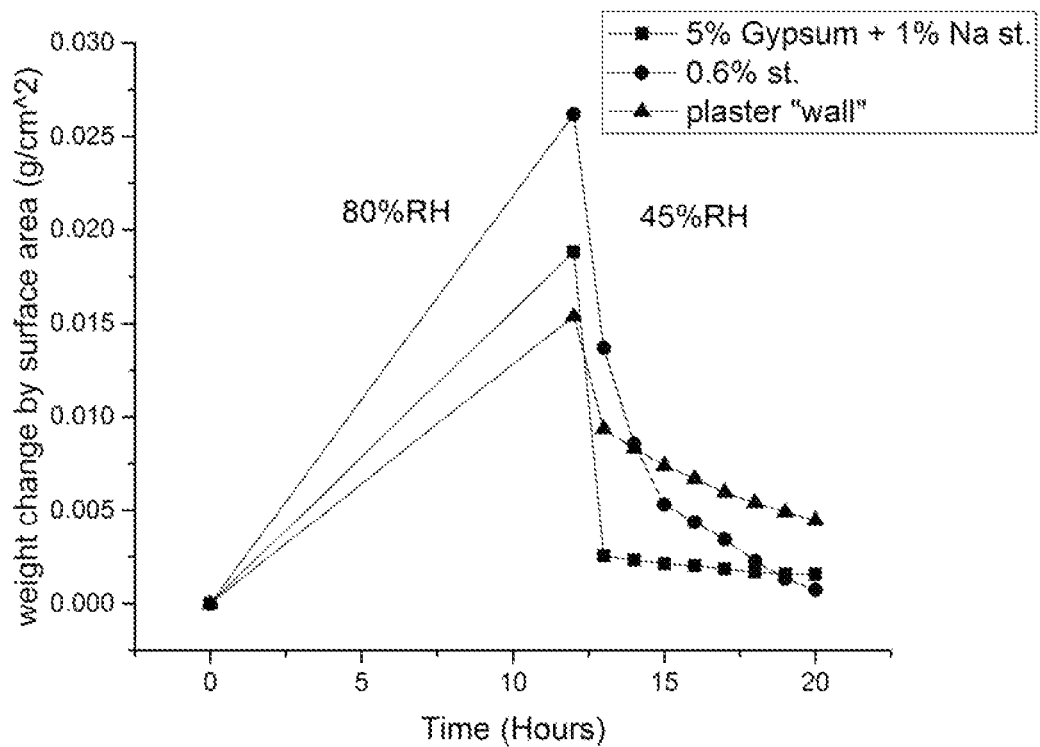
FIG. 5 depicts water uptake when conditioning a compressed formulated DSS at 80% RH and water release when reversing the conditions to 45% RH, both conditions at 40° C.

Humans prefer staying in rooms where humidity is in the range of 30-55% RH. Higher values cause humans to feel uncomfortable, as such humidity prevents cooling of the body by perspiration and evaporation. A salt wall can act as an active humidity controller: when humidity is high, the salt absorbs the humidity. When it is low, the salt releases the humidity to the air. This can be seen in FIG. 5: conditioning of a compressed formulated DSS at 80% RH, 40° C. shows weight increase of the cube due to water vapor take up by the salt for 8 hours. Once the relative humidity is lowered to 45% RH, the salt cube releases the water back to the environment.

Example 20—Preparation of Compressed Salt Board by Roll Pressing

Roll press is commonly used as a low cost method to produce metal foil from metal powders by compression Similar technique can be applied to produce compressed salt boards, with the potential of scaling up production at low cost and high throughput.

Figure 6:
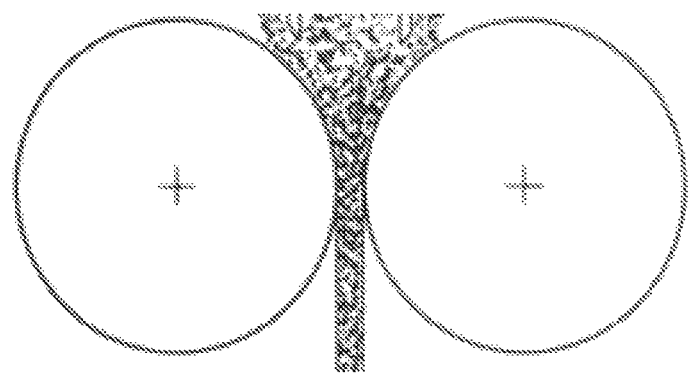
FIG. 6 shows schematically the pressing of salt boards in a roll press.

Formulated DSS granules or powder is poured gradually over the rollers of a roll press, as seen in the scheme in FIG. 6. The width of the board is determined by the distance between the rollers. A board is formed, where the center is well pressed, the edges are less compressed. Optionally, the edges are shaved off by a sharp knife.

Optionally, thin paper sheets are fed along with the salt powder, such that the come in direct contact with the rollers on either side, holding the salt between them.

In another option compression is applied in several steps, providing gradual compression: the salt powder is placed between two metal foils, that have a sponge spaced in between them, where the sponge spacer is glued to the bottom metal foil, such that a box is created for holding the salt powder. The box is inserted between the rollers multiple times, each time the space between the rollers is shortened. Consequently, the salt is compressed more by each passage. Gradual compression can be scale up to a high throughput process where salt is fed at one end, and is gradually compressed to boards.

Example 21—Utilization of Used Desalination Membranes

Given the global shortage in clean water, more and more desalination plants that purify sea or brackish water by reverse osmosis (RO) are built and operated worldwide. Along with that a growing tonnage of RO membranes that are no longer usable is being disposed, mostly by landfill (W. Lawler et al./*Desalination* 357 (2015) 45-54). An average of a hundred 8" RO modules, weighing 13 to 15 kg each that have a lifespan of 5-8 years is required to produce 1000 m³ water per day. Larger modules are also in use in desalination plants, overall weight is about 50 kg each. The heart of these modules is the RO membrane, which is capable of rejecting ions and letting through only water molecules. The RO membrane comprises about 33-35% of the module weight. Modern membranes are sophisticated, multi-layered membranes, commonly polyester (PET) base with polysulfone (PSf) supporting layer and polyamide (PA) active layer. There is much RD activity in this field resulting in improved membranes offered by dozens of companies worldwide. The module is encased in a fiberglass-polyester resin case, and contains also various separators and other structural parts made of polypropylene, polyester, Acrylonitrile butadiene styrene and glue.

Inevitably, the modules have a finite lifespan. The membranes eventually get fouled, or damaged by chlorine used as a disinfectant in the desalination plant (Geise et. al, *J. Poly. Sci. Part B Polymer Physics* 48 (2010) 1685-1718). While some technologies are available for refurbishing these modules, eventually they have to be disposed. Other than landfill disposal, any repurposing for any use required dismantling and shredding of the membranes, so such material is available commercially.

The membranes used in the RO modules were designed for long term operation under pressure and heat in salt water for prolonged years. They are therefore highly suitable to incorporate with solid salt objects of the invention.

The spent RO membranes are ground or shredded to fibers having the dimensions x, y, z, wherein z is the thickness of the membrane, which is not altered, x is the length of the shredded membrane and y is the width of the shredded membrane. The ratio between x and y is such that x is at least 2 times greater than y. The value of y can be 0.1 to 10 mm. Optionally, y is about 0.35 to 1 mm Optionally, x is 2, 3, 4, 5, 6, 7, 8, 9, 10 times greater so that the shape is elongated in one dimension.

The shredded membrane is mixed with the formulated salt aggregate or powder by any known mixing technique to obtain a well-mixed composition, at a ratio of about 0.01, 0.1, 0.5, 1, 1.5, 2, 2.5, 3, 3.5, 4, 4.5, 5% wt/wt. This mixture is pressed to form salt objects. The salt objects formulated with shredded RO membrane have improved elasticity properties. For example, a strain-stress graph shows a Young modulus that is at least 2, 3, 4, 5, fold greater. The yield point is increased at least 2, 3, 4, 5 fold.

Example 22—ICP Analysis of Salts

Samples of salts that can be used for producing formulated salt objects were collected at different sites of the Dead Sea. All samples were characterized for their composition by ICP-AES analysis. The results are summarized in Table 5. All samples were successfully formulated according to one of the examples above to provide formulated salt that can be utilized to make salt objects, which is deliquescent free up to conditions of 74% RH at 40° C.

TABLE 5

ICP analyses of samples collected at different sites at the Dead Sea. Sulfate concentrated was calculated assuming all sulfur is present as sulfate.

| Element | Sample 1 % wt | Sample 2 % wt | Sample 3 % wt | Sample 4 % wt |
|---|---|---|---|---|
| Na | 23 | 32.7 | 34.4 | 39.6 |
| Mg | 4.5 | 2.1 | 0.6 | 0.3 |
| Ca | 0.8 | 0.7 | 0.2 | 0.3 |
| Cl | 54 | 57.6 | 60.6 | 60.2 |
| K | 4.6 | 1.5 | 0.5 | 0.1 |
| Br | 0.4 | 0.2 | 0.1 | 0.1 |
| $SO_4^{2-}$ | 0.2 | 0.3 | 0.1 | 0.4 |

Example 23—Thermal Analyses of DSS and Formulated DSS

Samples of DSS and of DSS formulated according to Example 17. Each sample was analyzed in a Simultaneous Thermal Analyzer (STA, Netzsch, model STA 449 F3 Jupiter®) under nitrogen. The volatiles outlet of the STA instrument was coupled to a Quadrupole Mass Spectrometer (Netzsch, TGA/STA-QMS 403 D Aëolos®) such that volatiles released as a result of heating the sample are directly transferred via a fused silica capillary, heated to 300° C., into the electron impact source of the MS.

Figure 7:
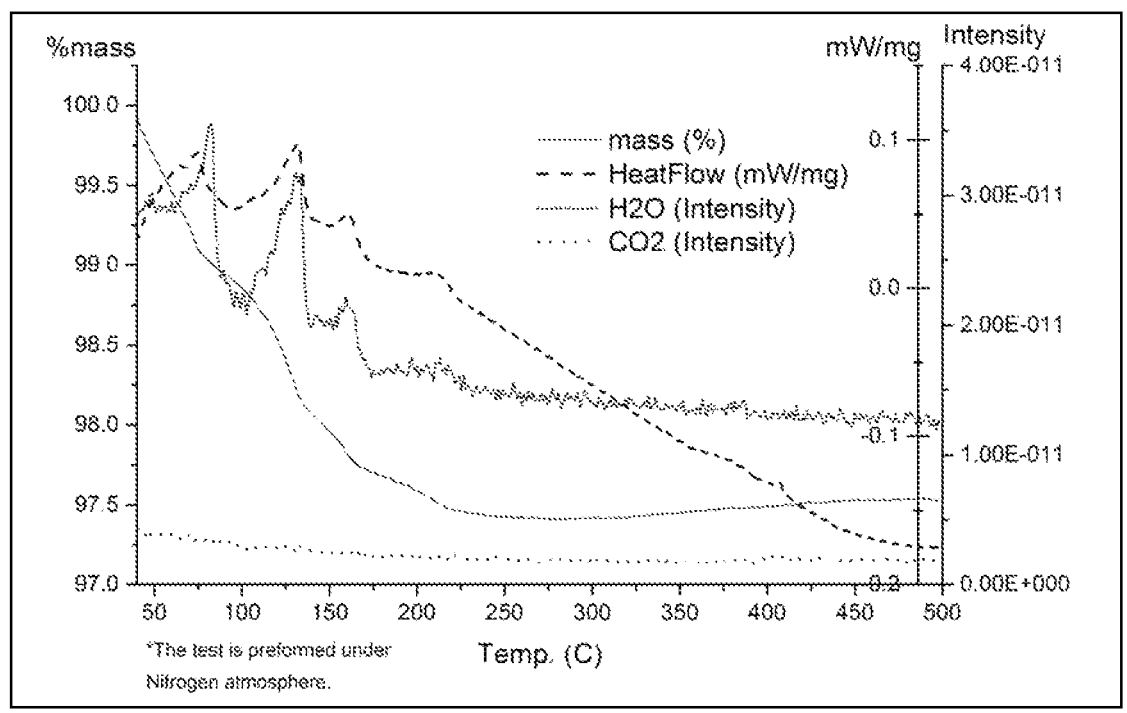
FIG. 7 shows thermograms of DSS as measured by simultaneous TGA and DSC, and the emission of water and $CO_2$ from the sample as analyzed by MS.

The thermograms of DSS are shown in FIG. 7, with the mass spectrometer set to follow $H_2O$ and $CO_2$ evaporation. The DSC scan shows 5 endotherms in the range 50 to 250° C., each endotherm associated with release of water molecules from different species of magnesium chlorides salts where the crystalline structure comprises hydrates, the peaks correspond to the following species: $MgCl_2(H_2O)_4$, $MgCl_2(H_2O)_2$, $MgCl_2(H_2O)_n$ wherein $1<n<2$, $Mg(OH)Cl$, $Mg(OH)Cl(H_2O)_{0.3}$, and $Mg(OH)Cl$.

Figure 8:
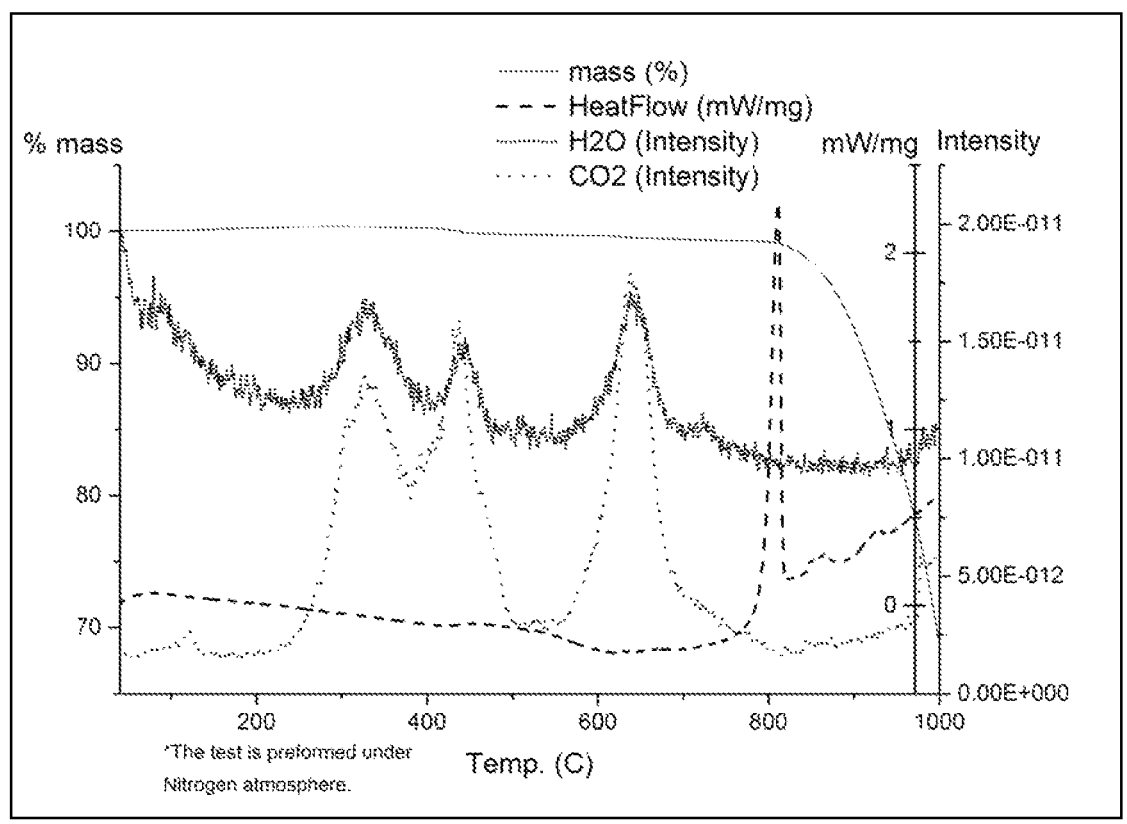
FIG. 8 shows thermograms of formulated DSS as measured by simultaneous TGA and DSC, and the emission of water and $CO_2$ from the sample as analyzed by MS.

FIG. 8 shows similar thermograms of formulated DSS. No endotherms are observed up to 800° C., corresponding to melting of NaCl. No endotherms are observed at the range 50 to 250° C., no release of water molecules is observed at that range as expected.

The invention claimed is:

1. A compressed salt water-resistant object, comprising:
a salt combination of a water-soluble salt comprising sodium chloride and at least one additional metal halide capable of interacting with carbonate or stearate to form a water-insoluble salt, and at least one additive selected from the group consisting of a water-soluble carbonate and a water-soluble stearate,
wherein the water-soluble carbonate and/or the water-soluble stearate in said salt combination interacts in situ with metal ions present in said salt combination to provide a water-insoluble salt of the carbonate and/or stearate, to impart the object with resistance to water and humidity,
the compressed salt water-resistant object being characterized by a compressive strength of at least 20 MPa, wherein the water-soluble salt of said salt combination comprises the byproduct of an industrial process, and wherein at least 90 wt % based on total weight of the salt combination is sodium chloride;
wherein the compressed salt water-resistant object is non-deliquescent even in absence of a coating, when measured at 40° C. at below 74% relative humidity; and wherein the compressed salt water-resistant object is a at least one of a block, board, a building unit, or a construction unit; and wherein the salt combination comprises:
at least 0.1 wt % magnesium or calcium;
at least 0.05 wt % potassium;
at least 0.05 wt % bromine; and
at least 0.05 wt % sulfate, wherein the amount of magnesium chloride or calcium chloride is less than 0.001 wt %.

2. The object according to claim 1, wherein the amount of the at least one additive, relative to the total weight of the salt combination, is at least 0.1 wt %.

3. The object according to claim 1, further comprising an additional additive selected from the group consisting of $C_{12}$ to $C_{20}$ carboxylates, $C_{12}$ to $C_{20}$ carboxylic acids, water-soluble silicates, siloxane polymers, siloxane polymer precursors, phosphate salts, hydroxide salts, gypsum, lime slag cements, water-insoluble carbonate salts, and combinations thereof.

4. The object according to claim 1, wherein the compressed salt combination further comprises at least one member selected from gypsum, or lime slag cement, or a water-soluble silicate, or a siloxane polymer precursor, or a siloxane polymer.

5. The object according to claim 1, wherein the object further includes a layer of additive added to the surface of the object as one of a film or a coat prior to compression.

6. A structure constructed of two or more compressed objects according to claim 1.

7. The object according to claim 1, wherein the water-soluble salt that is the byproduct of an industrial process includes Mg or Ca ions, and said additive comprises a water-soluble carbonate-based salt, wherein the carbonate ion in said carbonate-based salt interacts in situ with the Mg or Ca ions present in said byproduct of an industrial process.

8. The object according to claim 1, wherein the water-soluble salt that is the byproduct of an industrial process includes Mg or Ca ions, and said additive comprises a water-soluble stearate-based salt, wherein the stearate ion in said stearate-based salt interacts in situ with the Mg or Ca ions present in said byproduct of an industrial process.

9. The object according to claim 7, further comprising at least one additional additive selected from $C_{12}$ to $C_{20}$ carboxylates, $C_{12}$ to $C_{20}$ carboxylic acids, water-soluble silicates, siloxane polymers, siloxane polymer precursors, phosphate salts, hydroxide salts, gypsum, lime slag cements, water-insoluble carbonate salts, and combinations thereof.

10. The object according to claim 8, further comprising at least one additional additive selected from $C_{12}$ to $C_{20}$ carboxylates, $C_{12}$ to $C_{20}$ carboxylic acids, water-soluble silicates, siloxane polymers, siloxane polymer precursors, phosphate salts, hydroxide salts, gypsum, lime slag cements, water-insoluble carbonate salts, and combinations thereof.

11. A compressed salt water-resistant object, comprising:
a salt combination of a water-soluble salt comprising sodium chloride and at least one additional metal halide capable of interacting with carbonate or stearate to form a water-insoluble salt, and at least one additive selected from the group consisting of a water-soluble carbonate and a water-soluble stearate, wherein the water-soluble carbonate and/or the water-soluble stearate in said salt combination interacts in situ with metal ions present in said salt combination to provide a water-insoluble salt of the carbonate and/or stearate, to impart the object with resistance to water and humidity, the compressed salt water-resistant object being characterized by a compressive strength of at least 20 MPa, wherein the water-soluble salt of said salt combination comprises the byproduct of an industrial process, and wherein at least 90 wt % based on total weight of the salt combination is sodium chloride;

wherein the compressed salt water-resistant object is non-deliquescent even in absence of a coating, when measured at 40° C. at below 74% relative humidity; and wherein the compressed salt water-resistant object is a at least one of a block, board, a building unit, or a construction unit; and wherein the water-soluble salt that is the byproduct of an industrial process includes Mg or Ca ions, and said additive comprises a water-soluble stearate-based salt, wherein the water-soluble stearate ion in said stearate-based salt interacts in situ with the Mg or Ca ions present in said byproduct of an industrial process.

12. The object according to claim 11, wherein the amount of the at least one additive, relative to the total weight of the salt combination, is at least 0.1 wt %.

13. The object according to claim 11, further comprising an additional additive selected from the group consisting of $C_{12}$ to $C_{20}$ carboxylates, $C_{12}$ to $C_{20}$ carboxylic acids, water-soluble silicates, siloxane polymers, siloxane polymer precursors, phosphate salts, hydroxide salts, gypsum, lime slag cements, water-insoluble carbonate salts, and combinations thereof.

14. The object according to claim 11, wherein the compressed salt combination further comprises at least one member selected from gypsum, or lime slag cement, or a water-soluble silicate, or a siloxane polymer precursor, or a siloxane polymer.

15. The object according to claim 11, wherein the object further includes a layer of additive added to the surface of the object as one of a film or a coat prior to compression.

16. A structure constructed of two or more compressed objects according to claim 11.

17. The object according to claim 11, wherein the water-soluble salt that is the byproduct of an industrial process includes Mg or Ca ions, and said additive comprises a water-soluble carbonate-based salt, wherein the water-soluble carbonate ion in said carbonate-based salt interacts in situ with the Mg or Ca ions present in said byproduct of an industrial process.

18. The object according to claim 17, further comprising at least one additional additive selected from $C_{12}$ to $C_{20}$ carboxylates, $C_{12}$ to $C_{20}$ carboxylic acids, water-soluble silicates, siloxane polymers, siloxane polymer precursors, phosphate salts, hydroxide salts, gypsum, lime slag cements, water-insoluble carbonate salts, and combinations thereof.

* * * * *